United States Patent
Horton et al.

(10) Patent No.: US 9,990,114 B1
(45) Date of Patent: Jun. 5, 2018

(54) CUSTOMIZABLE PUBLICATION VIA MULTIPLE OUTLETS

(75) Inventors: Noah Horton, San Francisco, CA (US); Salman Ansari, San Francisco, CA (US); Eran Cedar, San Francisco, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 648 days.

(21) Appl. No.: 13/004,790

(22) Filed: Jan. 11, 2011

Related U.S. Application Data

(60) Provisional application No. 61/426,987, filed on Dec. 23, 2010.

(51) Int. Cl.
| | |
|---|---|
| G06F 3/00 | (2006.01) |
| G06F 3/0484 | (2013.01) |
| G06F 3/0482 | (2013.01) |
| G06F 3/01 | (2006.01) |
| G06F 17/30 | (2006.01) |

(52) U.S. Cl.
CPC ........ G06F 3/04842 (2013.01); G06F 3/0482 (2013.01); *G06F 17/3056* (2013.01); *G06F 17/3089* (2013.01)

(58) Field of Classification Search
CPC ........... G06F 17/3089; G06F 17/30867; G06F 17/24; G06F 3/04842; G06F 3/0482; G06F 17/211; G06F 17/30274; G06F 17/3056; G06Q 50/01
USPC ........................................................ 715/738
See application file for complete search history.

(56) References Cited

U.S. PATENT DOCUMENTS

| | | | |
|---|---|---|---|
| 7,599,935 B2 * | 10/2009 | La Rotonda | ........... G06Q 10/10 |
| 7,873,988 B1 | 1/2011 | Issa et al. | |
| 8,296,380 B1 * | 10/2012 | Kelly | ................ G06F 17/30528 |
| | | | 703/23 |
| 8,402,057 B2 | 3/2013 | Shin | |
| 2001/0040889 A1 | 11/2001 | Matsuzaki et al. | |
| 2002/0032037 A1 | 3/2002 | Segawa | |
| 2002/0069106 A1 | 6/2002 | Shopsowitz | |
| 2002/0130904 A1 * | 9/2002 | Becker | .................. G06F 3/0481 |
| | | | 715/753 |
| 2003/0187801 A1 | 10/2003 | Chase et al. | |
| 2004/0003270 A1 | 1/2004 | Bourne et al. | |

(Continued)

OTHER PUBLICATIONS

Non-final Office Action dated Sep. 6, 2012, for U.S. Appl. No. 13/004,796.

(Continued)

*Primary Examiner* — Nicholas Augustine
(74) *Attorney, Agent, or Firm* — Invoke

(57) ABSTRACT

Customizing publication via multiple outlets includes presenting a user interface for publishing a communication on a plurality of outlets; receiving an initial version of a communication; displaying the initial version of the communication in each of a plurality of editing windows simultaneously, wherein each of the plurality of editing windows corresponds to one of the plurality of outlets or a platform associated with one or more of the plurality outlets; receiving a customization to at least one of the displayed initial versions of the communication; and publishing the communication on each of the plurality of outlets, including the customization to at least one of the displayed initial versions of the communication.

29 Claims, 24 Drawing Sheets

(56) References Cited

U.S. PATENT DOCUMENTS

| | | |
|---|---|---|
| 2004/0167926 A1 | 8/2004 | Waxman et al. |
| 2004/0168077 A1 | 8/2004 | Waxman et al. |
| 2004/0249815 A1 | 12/2004 | Lee |
| 2005/0044049 A1 | 2/2005 | Okayama et al. |
| 2005/0097359 A1 | 5/2005 | Speare et al. |
| 2005/0119977 A1 | 6/2005 | Raciborski |
| 2006/0074915 A1* | 4/2006 | Bhandarkar ............ G06Q 10/10 |
| 2006/0173788 A1 | 8/2006 | Nath Pandya et al. |
| 2006/0229990 A1 | 10/2006 | Shimoji et al. |
| 2008/0052371 A1* | 2/2008 | Partovi .................... G06Q 10/10 709/217 |
| 2008/0073936 A1* | 3/2008 | Jeng ........................ G06F 3/0481 296/180.1 |
| 2008/0086439 A1 | 4/2008 | Brough et al. |
| 2008/0097923 A1 | 4/2008 | Kim et al. |
| 2008/0116255 A1 | 5/2008 | Hilbert et al. |
| 2008/0184138 A1* | 7/2008 | Krzanowski ...... G06F 17/30873 715/760 |
| 2009/0069912 A1* | 3/2009 | Stefik ................ G06F 17/30761 700/94 |
| 2009/0125420 A1* | 5/2009 | Zhang ................ G06Q 30/0601 705/26.1 |
| 2009/0144741 A1* | 6/2009 | Tsuda ...................... G06F 9/5027 718/104 |
| 2009/0164904 A1* | 6/2009 | Horowitz .......... G06F 17/30817 715/723 |
| 2009/0254838 A1* | 10/2009 | Rao .................. G06F 17/30702 715/749 |
| 2010/0312769 A1 | 12/2010 | Bailey et al. |
| 2011/0047479 A1* | 2/2011 | Ghosh ........................... 715/747 |
| 2011/0145342 A1* | 6/2011 | Berger ................. G06Q 10/109 709/206 |
| 2011/0153759 A1* | 6/2011 | Rathod ............. G06F 17/30867 709/206 |
| 2011/0154370 A1* | 6/2011 | Yu ...................... G06F 11/0709 719/318 |
| 2011/0181906 A1* | 7/2011 | Grueneberg .......... G06F 3/1204 358/1.15 |
| 2011/0213670 A1* | 9/2011 | Strutton ................. G06Q 30/02 705/14.73 |
| 2011/0231892 A1* | 9/2011 | Tovar ..................... H04L 63/10 726/1 |
| 2011/0307791 A1* | 12/2011 | Pierre .................... G06Q 10/10 715/736 |
| 2012/0042020 A1* | 2/2012 | Kolari et al. ................. 709/206 |
| 2012/0042025 A1* | 2/2012 | Jamison ............... G06Q 10/107 709/206 |
| 2012/0084644 A1* | 4/2012 | Robert ............. G06F 17/30126 715/255 |
| 2012/0109777 A1* | 5/2012 | Lipsitz et al. ............... 705/26.5 |
| 2012/0158494 A1* | 6/2012 | Reis .................. G06Q 30/0241 705/14.49 |
| 2012/0167137 A1* | 6/2012 | Wong ................. H04N 21/2743 725/38 |

OTHER PUBLICATIONS

Final Office Action dated Feb. 5, 2013, for U.S. Appl. No. 13/004,796.
Non-final Office Action dated Jun. 17, 2013, for U.S. Appl. No. 13/004,796.
Final Office Action dated Dec. 11, 2013, for U.S. Appl. No. 13/004,796.
Notice of Allowance and Fees Due dated Apr. 17, 2015, for U.S. Appl. No. 13/004,796.
McNay; Enterprise content management: an overview: Published in: Professional Communication Conference, 2002. IPCC 2002. Proceedings. IEEE International; Date of Conference: 2002; pp. 396-402; IEEE Xplore.
Koskinen; Social software for industrial interaction; Published in: Proceeding OZCHI '06 Proceedings of the 18th Australia conference on Computer-Human Interaction: Design: Activities, Artefacts, Artefacts and Environments; 2006; pp. 381-384; ACM Digital Library.

* cited by examiner

FIG. 14

CUSTOMIZABLE PUBLICATION VIA MULTIPLE OUTLETS

CROSS REFERENCE TO OTHER APPLICATIONS

This application claims priority to U.S. Provisional Patent Application No. 61/426,987 entitled CUSTOMIZABLE PUBLICATION VIA MULTIPLE OUTLETS filed Dec. 23, 2010 which is incorporated herein by reference for all purposes.

BACKGROUND OF THE INVENTION

People who manage brands ("brand managers") are interested in marketing their brands online across various channels, such as interactive websites. Interactive websites such as social networks are part of a growing market for online brand marketing. Typical methods for brand management across interactive websites include manually creating accounts for each of the websites and manually customizing content to be published at each of the websites. Often times, multiple product types (e.g., apparel versus accessories) or multiple brands (e.g., Coke versus Diet Coke) are associated with one brand and so a brand manager needs to create a different account for each of the product types affiliated with a single brand. Different interactive websites might differ in the capabilities they allow in publishing (e.g., one website might restrict the length of content, while another may not). Furthermore, the brand manager needs to customize each message for each product type affiliated with a single brand at each of the websites at which there is an account; such manual tailoring of brand content to each website using existing techniques is very time consuming. It would be desirable to develop new techniques to manage customizable distribution of content (e.g., brand marketing content) across different channels that overcome some or all of the issues described above.

BRIEF DESCRIPTION OF THE DRAWINGS

Various embodiments of the invention are disclosed in the following detailed description and the accompanying drawings.

FIG. 14 is a diagram showing an embodiment of a published communication at an outlet at the "Facebook" platform.

DETAILED DESCRIPTION

Figure 1:
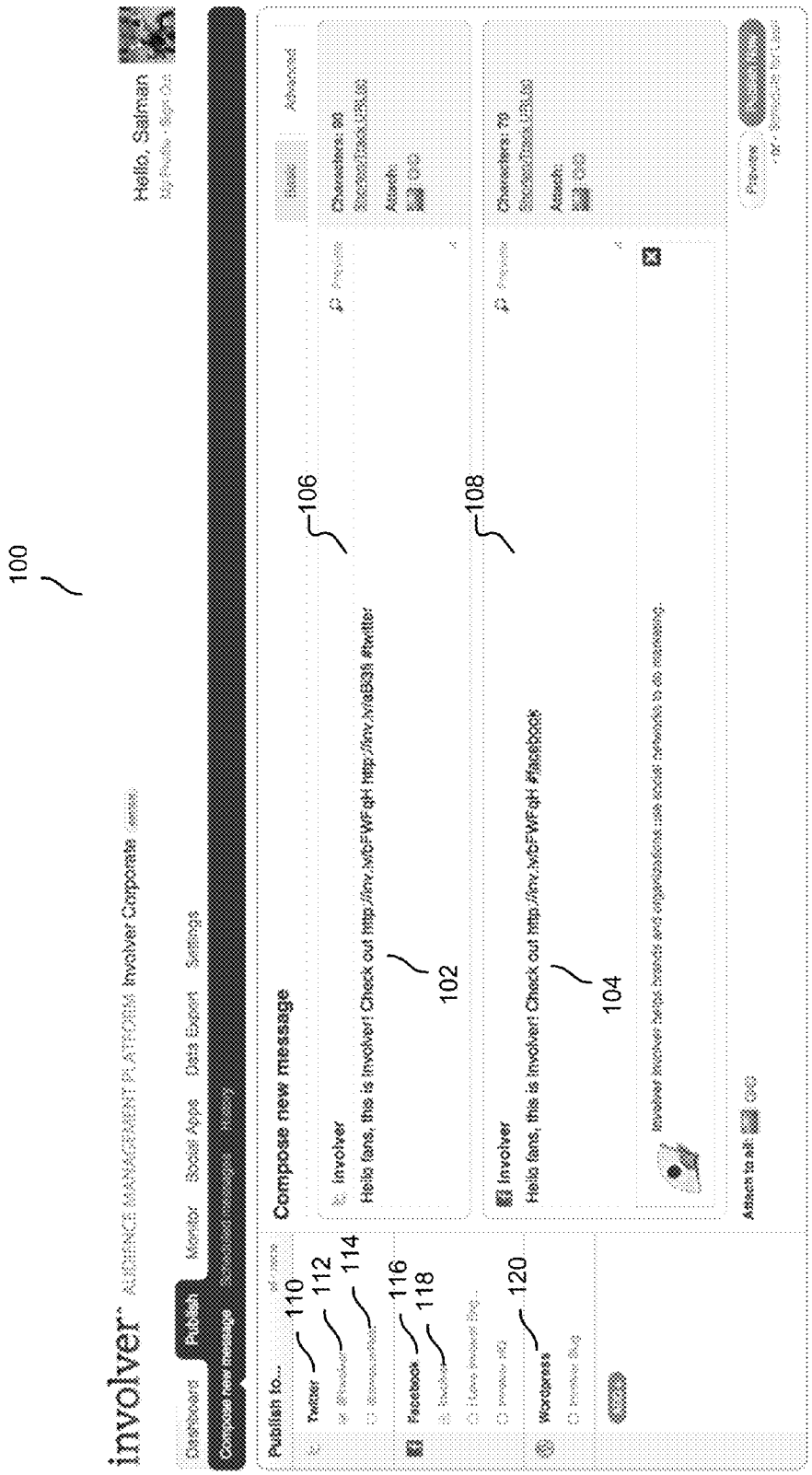
FIG. 1 is a diagram showing an embodiment of a user interface for a customization of a communication for publication across multiple outlets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Customizing a communication for publication across multiple outlets in an efficient manner is disclosed herein. A communication for publication at various outlets (which may be customized as desired) is received. In some embodiments, the communication is stored and/or tracked in order to gauge relevant interest in the communication. A communication may comprise of text, links, images, video, and rich media (such as metadata or tags used by the relevant outlet for layout, presentation or other handling at the outlet), among other things. In some embodiments, a communication may pertain to marketing associated with a particular brand or product. In some embodiments, an outlet is an account at an interactive website or platform. Examples of platforms may include social networks, blogs or other platforms. Each platform may have its own configuration and interface for displaying published communications. For example, some platforms may only display text (and not images). Another example is that a platform may display images but only in the form of a link to a separate page that displays the image. A publication may entail a display of a message at the outlet in which either subscribers to the platform associated with the outlet or the general public may have access to view and potentially interact with the published communication.

Sometimes, a similar message is intended to be published at each of the various outlets but the message needs to be customized, for example to conform to specified parameters of a particular platform, stylistic preferences, or a desire to track the communication, among other reasons. In some embodiments, an initial version of a communication is received at a user interface and reproduced (prior to publication) at multiple displays or interfaces, each of which is associated with a corresponding selected outlet at which the communication is to be published. This enables a user to customize each communication for each of the selected outlets as desired prior to publication. In some embodiments, each of the displayed communications may be previewed at the user interface to view its published appearance at one or more of the selected outlets. In some embodiments, a displayed communication may be scheduled to be published at a future time. In some embodiments, the displayed communication may be published at each of the selected outlets where each of the published communications is automatically conformed (e.g., by an automated process) to the configuration and interface specified for its corresponding platform.

FIG. 1 is a diagram showing an embodiment of a user interface for a customization of a communication for publication across multiple outlets. In some embodiments, user interface 100 is shown to and used by brand managers who desire to publish marketing content regarding the brand and/or products that they manage. User interface 100 shows a communication to be published at two outlets, each of which is associated with a different platform. In this example, content may be published via any or all of platforms 110, 116 and 120 (i.e., "Twitter", "Facebook," and "Wordpress," respectively), as shown on the left hand side of user interface 100. Each platform includes one or more outlets (e.g., platform 110 includes outlets 112 and 114). In this example, the communication is to be published at selected outlet 112 ("Involver") on platform 110 ("Twitter") and selected outlet 118 ("Involver") on platform 116 ("Facebook"). Other outlets (e.g., 114) at which a communication may be published are present but are not selected in this example.

In some embodiments, an outlet may be an account associated with a particular platform. An account entails or is otherwise associated with a capability to participate in the functions (e.g., befriend other account holders, view and/or comment on content of related or permitted accounts, publish content, share content, etc.) associated with the platform. Examples of platforms include social networks (e.g., Facebook, Twitter), blogs (e.g., Wordpress), and other platforms (e.g., an application running on a smart phone or YouTube), such as corporate websites that have had social elements added (like sharing or user profiles). As shown in user interface 100, a platform may be associated with more than one outlet. Communication 102 is displayed to be customized (if desired) in input box 106 for outlet 112 and communication 104 is displayed to be customized (if desired) in input box 108 for outlet 118. In some embodiments, one communication was received by user interface 100 and user interface 100 automatically populated the input boxes 106 and 108 with the single received communication. The displayed communications may each be customized accordingly (e.g., by a user entering the content and/or using a tool or operation provided by the user interface), resulting in message 102 and message 104 as shown. As will be further described below, one type of customization is to shorten links inside displayed communications, as can be seen in messages 102 and 104.

One example of utilizing user interface 100 is a brand manager who wishes to publish a communication at various outlets to convey the date of an upcoming release of a product made by a brand that he manages. The brand manager selects at least one outlet (e.g., outlets 112, 114, and/or 118) at which he wishes to publish the communication in user interface 100. Then the brand manager may enter a message to be published into user interface 100 (not shown). User interface 100 then populates the input boxes that correspond to the selected outlet(s) with the entered message. The brand manager can then customize each message (e.g., messages 102 and 104) displayed in its respective outlet editing window (e.g., editing windows 106 and 108). Examples of customization may include changing the displayed text, shortening a displayed link (e.g., using bit.ly as shown here), adding a tag or metadata (e.g., #twitter or #facebook) or adding additional content such as an image.

Figure 2:
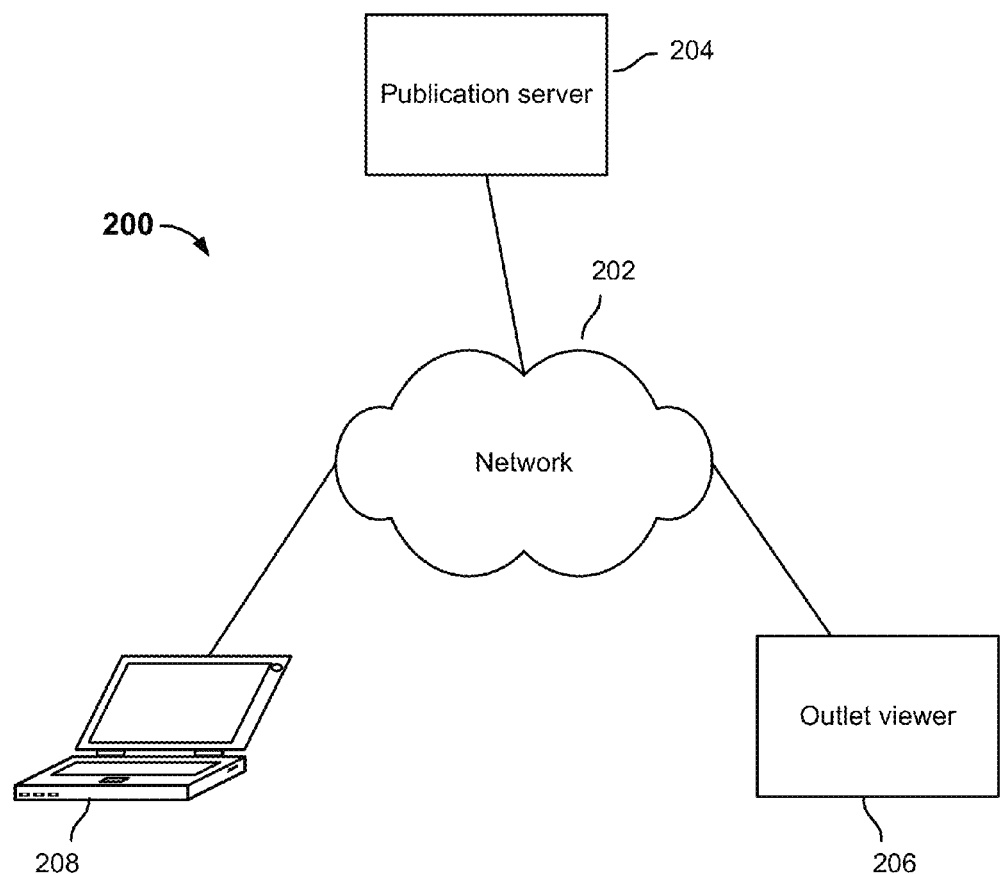
FIG. 2 shows an embodiment of a system for customizing a communication for publication across multiple outlets.

FIG. 2 shows an embodiment of a system for customizing a communication for publication across multiple outlets. In some embodiments, system 200 may be used to implement user interface 100. In this example, system 200 comprises of publication server 204, end user 208, outlet viewer 206, and network 202.

Figure 13A:
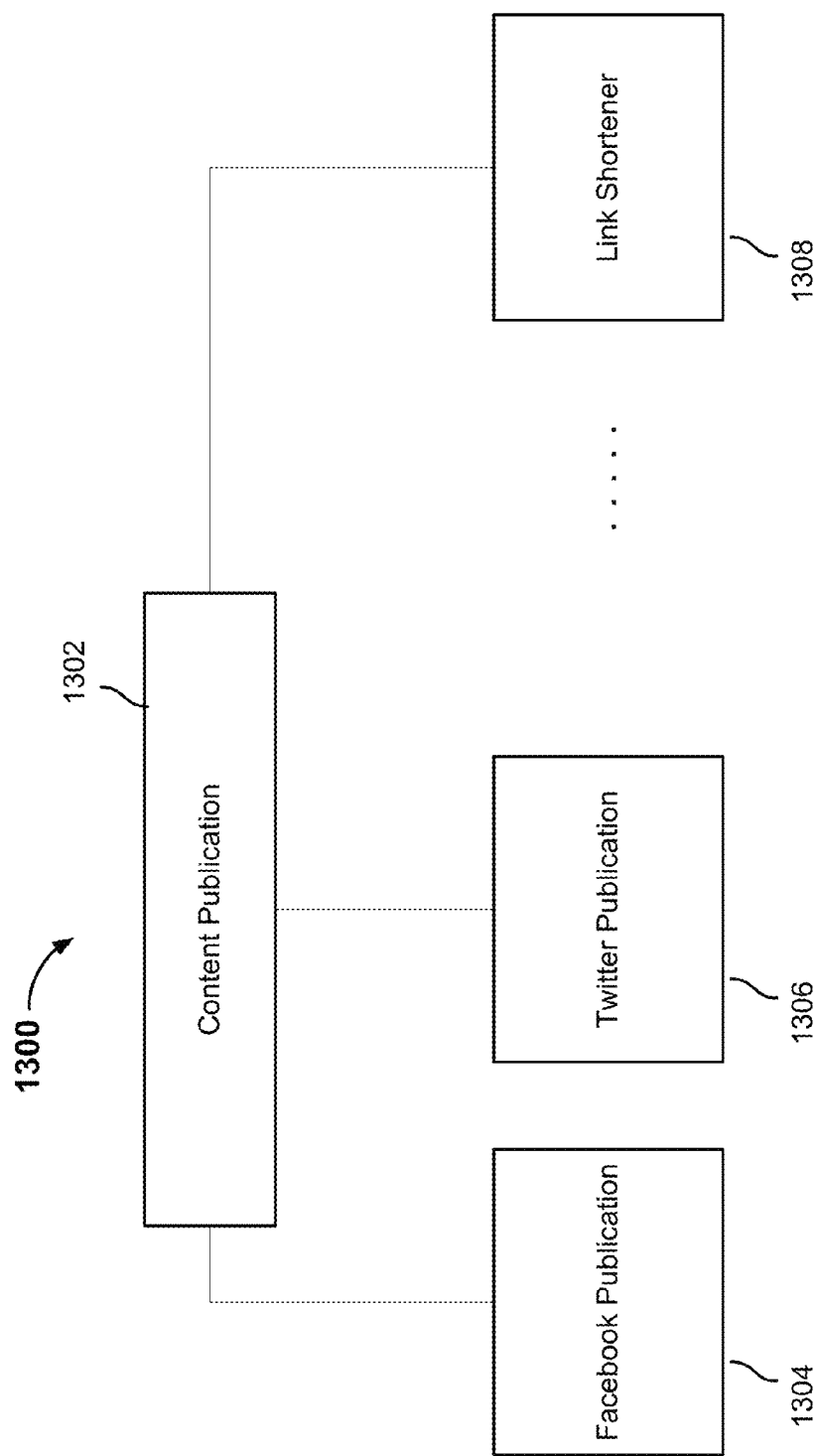
FIG. 13A is a diagram showing an embodiment of publication modules included in a publication server.
Figure 13B:
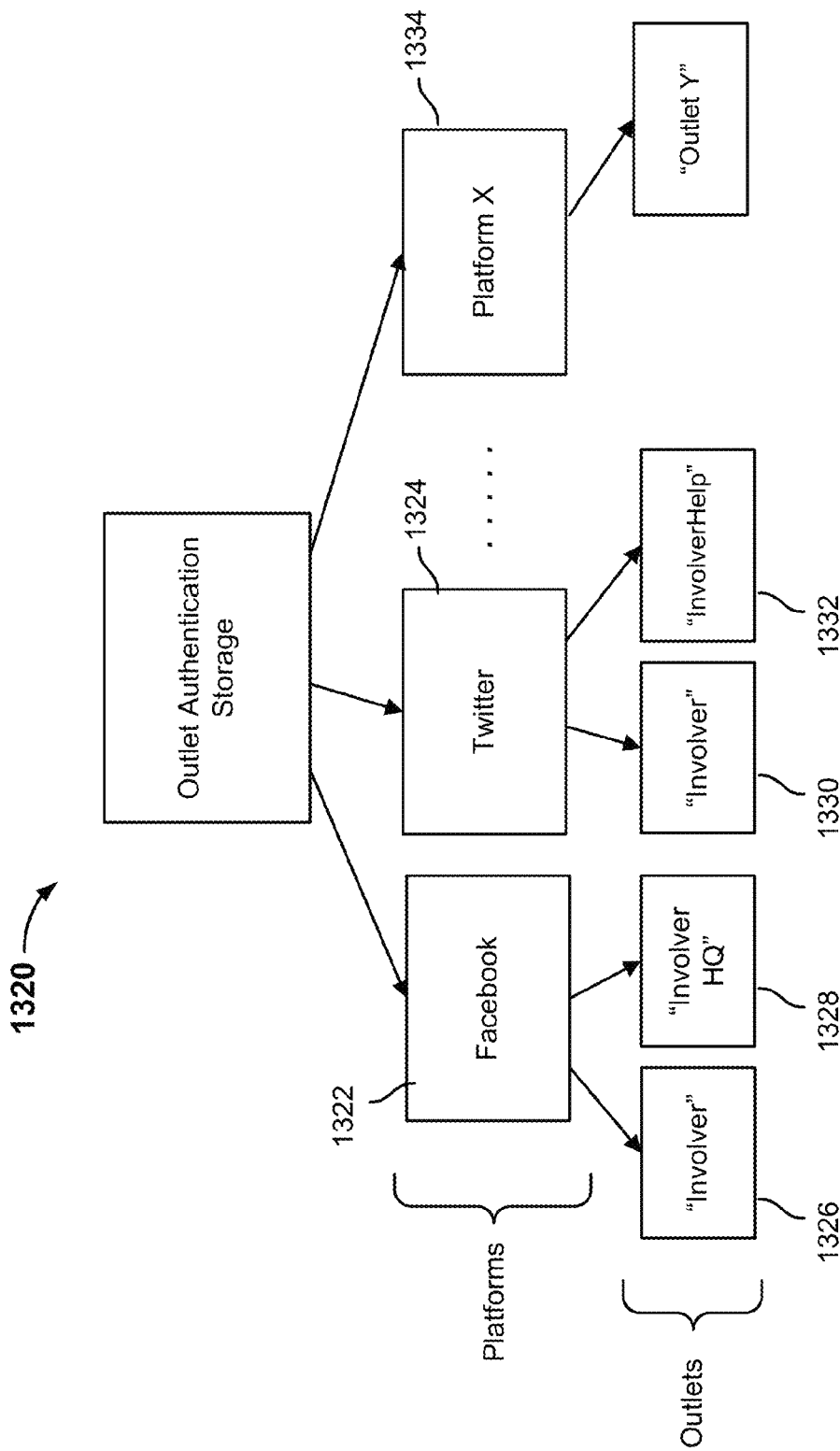
FIG. 13B is a diagram showing a system which stores authentication information for various outlets associated various platforms.

In the example shown in system 200, publication server 204 communicates to end user 208 and platform subscribers 206 through network 202 to receive and publish content at various outlets. Although this figure shows user 208 as communicating via a computer, a variety of devices may be used, including (but not limited to) a Internet browser application or a specialized application running on a smart phone or other device. In various embodiments, network 202 includes various high speed data networks and/or telecommunications networks. Publication server 204 may be linked to various outlets at various platforms (not shown). Links between publication server 204 and various outlets may be established via, but not limited to, the following examples: a secure authentication service or an exchange of identification information and passwords. FIGS. 13A and 13B describe some embodiments of content publishing.

Regardless of the method of linking publication server 204 and various outlets, the result of the linking is that publication server 204 has the ability to publish content at the various outlets. In some embodiments, publication server 204 may display a user interface, such as user interface 100, to end user 208. Publication server 204 is configured to receive an initial version of a communication to be published and a selection of linked outlets at which to publish the communication which is customized as desired. Once the user adjusts or configures the communication as desired, publication server 204 may distribute the communication for display at each of the selected outlets. In some embodiments, publication server 204 may receive customizations to one or more of the displayed communications. In some embodiments, publication server 240 may receive an indication to publish the communication at a time in the future. In publishing potentially varied communications customized for various outlets associated with various platforms, publication server 204 is able to automatically accommodate the publishing requirements of each different platform and/or the desired customization of the end user while providing the convenience of receiving initial or base content and automatically populating it in respective windows for editing. This makes customized publication easier and faster for a user since they do not have to manually enter an initial or base content in over and over. The user is also able to observe (at the same time and from a single interface) what the customization is like for each selected outlet.

End user 208 communicates with publication server 204 over network 202 to enter and customize communications to be published at various outlets. End user 208 may communicate with the publication server via a computing device or mobile device. In some embodiments, end user 208 may provide information to publication server 204 via a user interface, such as user interface 100. In some embodiments, an end user accesses such a user interface by accessing a website (e.g., www.involver.com) and entering security or verification information (e.g., a user name, password, stored token, etc.). In some embodiments, end user 208 may select at least one outlet at which to publish a communication through the user interface (not shown). End user may enter an initial or base communication into the user interface. In some embodiments, an end user 208 may customize the initial or base communication for publication for each of the selected outlets as desired.

Outlet viewer 206 communicates with the publication server 204 and various platforms (not shown) over network 202 to view published communications. In some embodiments, an outlet viewer is a subscriber to a particular outlet, for example a subscriber to a particular Twitter feed or a fan of a Facebook entity. In some embodiments, the published communication is accessible to all members or anonymous members (e.g., without prior approval or prior establishment of a relationship between the publisher and the viewer). Examples of devices used by outlet viewer 206 to access published communications include computing devices and/or mobile devices (e.g., a smart phone or a tablet computer). Regardless of the specific embodiment of outlet viewer 206, outlet viewer 206 is capable of at least viewing, if not also interacting with, the content published by publication server 204. Outlet viewer 206 may be signed in, subscribing to, or otherwise have access to an outlet of a platform associated with the published content.

Returning to the former example of a brand manager who wishes to publish a communication at various outlets, the brand manager may do so on system 200. The brand manager (e.g., end user 208) may send information to a publication server, such as publication server 204. For example, the brand manager may manage a brand associated with a line of tennis shoes. In this example, the brand manager may have two accounts (e.g., outlets) dedicated to distributing information regarding the brand's line of tennis shoes, where one account is at a first social network and the other account is at a second social network (e.g., platforms). The example outlets associated with the line of tennis shoes are already linked to a publication server; this process is described in further detail below. The brand manager may then enter and customize messages regarding, for example, an upcoming release of a new model of shoe in the line of tennis shoes for each of the two outlets at a user interface provided by the publication server. The publication server may then publish the messages for each of the outlets on the platforms associated with the respective outlets. A person who is a subscriber (or in general has access to the published communication) to either or both platforms may then view the published content regarding the upcoming release via an outlet viewer, such as outlet viewer 206.

Figure 3:
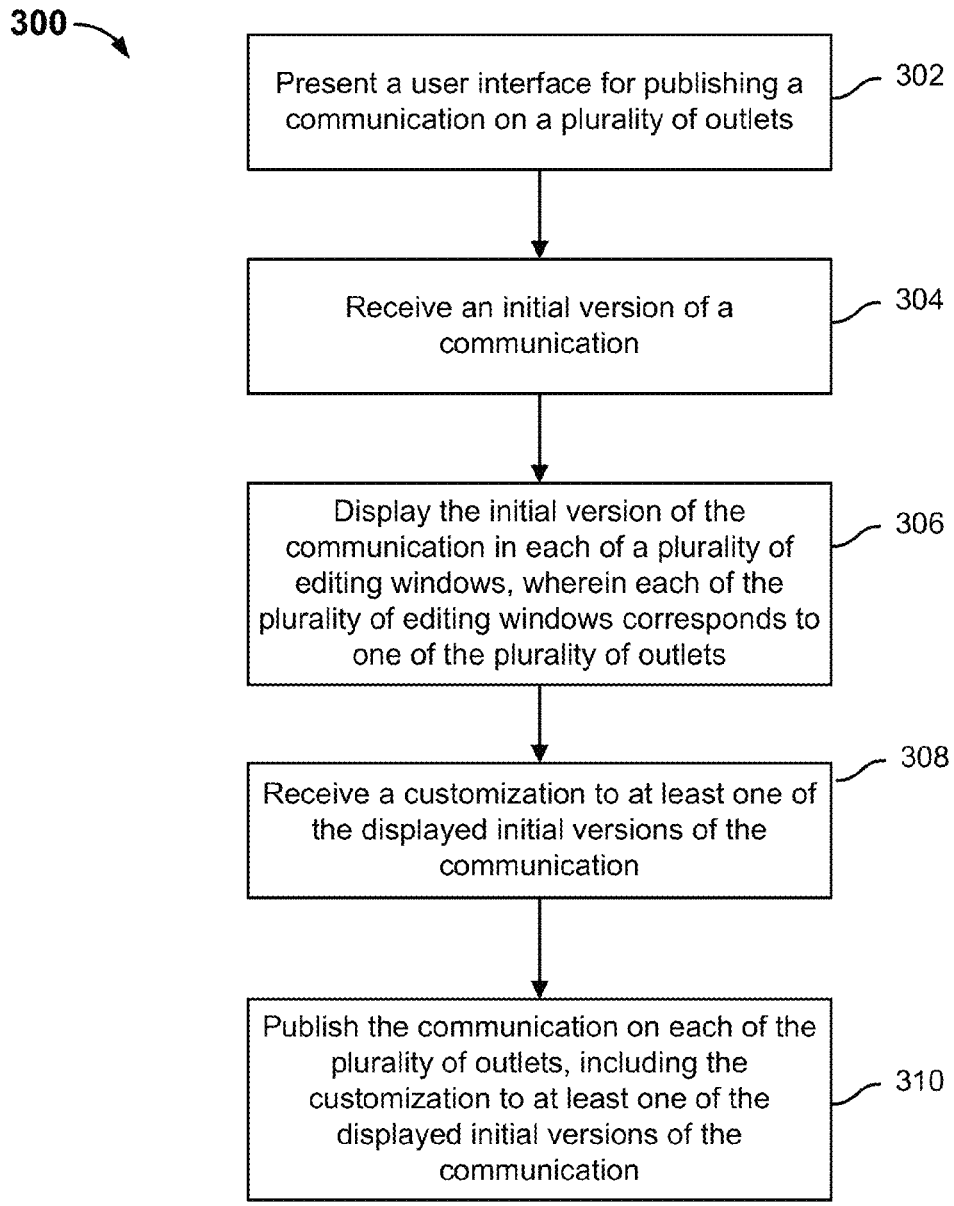
FIG. 3 is a flowchart illustrating an embodiment of a process for customizing a communication for publication across multiple outlets.

FIG. 3 is a flowchart illustrating an embodiment of a process for customizing a communication for publication across multiple outlets. In some embodiments, process 300 is performed by publication server 204 of FIG. 2. As mentioned above, a communication may comprise of text, links, images, and rich media, among other things. Also, as mentioned above, an outlet is an account associated with a platform (e.g., a social network, blog, etc.).

At step 302, a user interface is presented for publishing a communication on a plurality of outlets. For example, publication server 204 may present user interface 100 in FIG. 1, in which outlets for publication may be selected and a communication may be customized as desired for each outlet. In some embodiments, outlets at which content is to be published is selected via such a user interface.

At step 304, an initial version of a communication is received. For example, a (single) initial or base communication may be received from end user 208 at publication server 204 in FIG. 2. In some embodiments, an initial or base communication may be typed, pasted, or imported into a user interface. In some embodiments, a communication includes an image, video, a URL, tags or other metadata, etc.

At step 306, the initial version of the communication is displayed in each of a plurality of editing windows for a user to edit, wherein each of the plurality of editing windows corresponds to one of the plurality of outlets. For example, the initial or base communication is populated in multiple editing windows, each editing window of which is associated with a corresponding outlet. See, e.g., FIG. 1 where editing window 106 corresponds to outlet 112 and editing window 108 corresponds to outlet 118 in user interface 100. In some embodiments, the same communication is populated in each of the editing windows associated with each selected outlet.

At step 308, a customization to at least one of the displayed initial versions of the communication is received. For example, a link within a displayed communication may be shortened and tracked, as seen in messages 102 and 104 of FIG. 1 and as described in further detail below. Examples of customizations to a communication include shortening and tracking links, addition or deletion of text, attaching links, attaching images, attaching rich media, among others. In some embodiments, a customization is entered or performed by an end user. For example, one outlet may be viewed by generally older customers whereas another outlet may be viewed by generally younger customers. A brand manager may edit the communication destined for the older customers so that proper grammar, punctuation and complete spelling are used. In contrast, the communication destined for the younger customers may use slang, netspeak, etc. In some embodiments, a customization is performed by a user interface or publication server (e.g., automatically without user intervention or under the direction of an end user).

At step 310, the communication is published on each of the plurality of outlets, including the customization to at least one of the displayed initial versions of the communication. In some embodiments, the communication for each outlet is published such that the display of the communication at each outlet automatically accommodates the publishing requirements of the one or more platforms associated with the outlets (e.g., by a publication server which formats or otherwise processes each communication as appropriate for a particular platform). Furthermore, the published communication at each outlet also reflects the desired customization of the end user. In some embodiments, publication server 204 in FIG. 2 is configured to accommodate the publication of each communication to the display configurations and requirements of each of the platforms associated with the outlets.

The following figures show in more detail some features regarding entry of an initial version of a communication and/or subsequent customization of an initial version of a communication for publication across multiple outlets, some features which have been already been discussed and some features which have yet to be mentioned.

Figure 4:
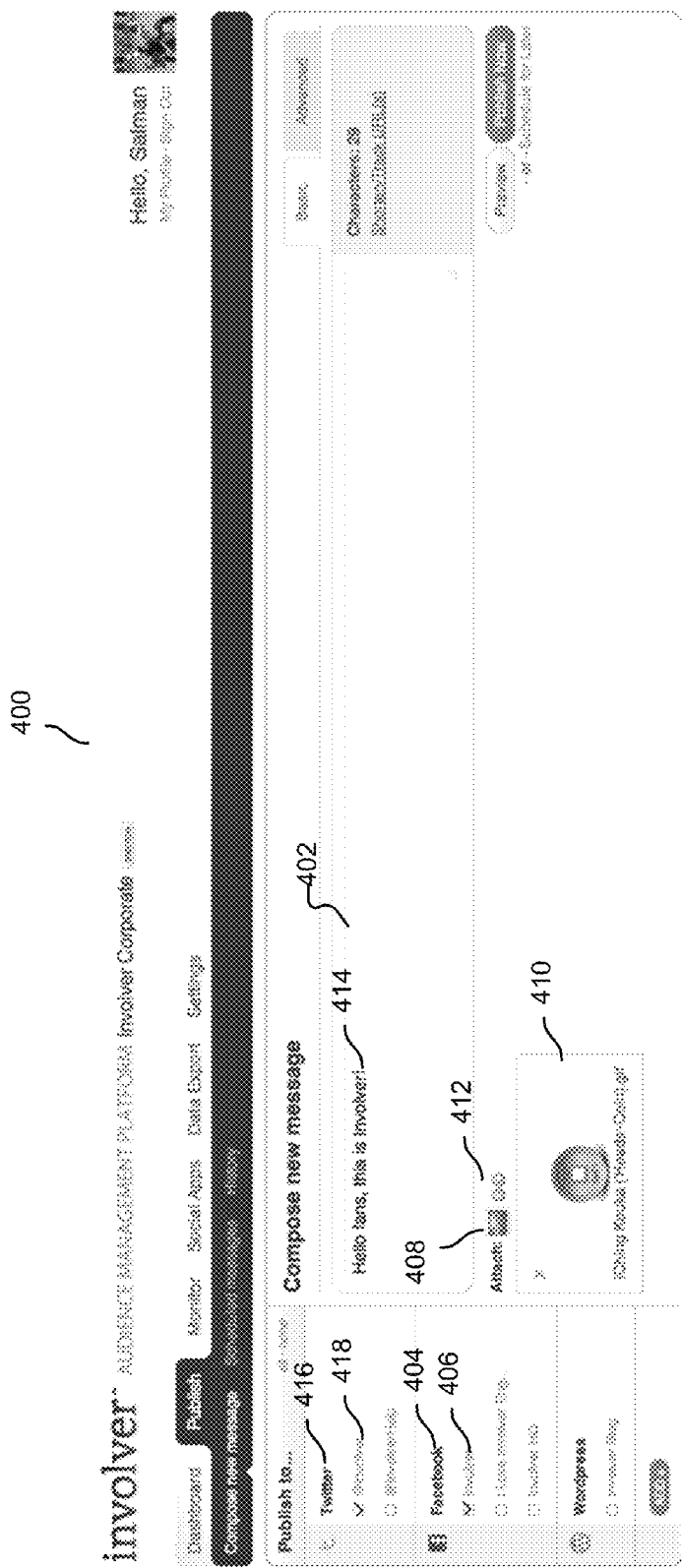
FIG. 4 is a diagram showing an embodiment of a user interface for attaching an image into a communication to be published.

FIG. 4 is a diagram showing an embodiment of a user interface for attaching an image into a communication to be published. In the example shown in FIG. 4, outlet 418 associated with platform 416 and outlet 406 associated with platform 404 are selected. In some embodiments, one or more outlets may be selected and/or a different combination of outlets and their associated platforms may be selected. Message 414 is an example of an initial version of a communication entered into editing window 402 associated with the selected outlets. In some embodiments, one editing window may be shown for all selected outlets and in some other embodiments, an editing window may be shown for each selected outlet. In the example shown, one editing window (402) is shown for two selected outlets (418 and 406). Below editing window 402 are embodiments of buttons for attaching an image 408 and attaching a link 412. Upon selecting image attachment button 408, a prompt is displayed (not shown) to select an image to be attached to the communication. In some embodiments, the selection of the image may be from stored files or from a webpage. In the example shown in FIG. 4, image 410 was selected. In some embodiments, depending on the size of the selected image, image 410 may be only a thumbnail or the actual size of the selected image.

Returning to the former example of the brand manager publishing content regarding the line of tennis shoes that he manages, the brand manager may attach an image to his communication using interface 400. For example, the brand manager may attach an image of the shoe to the communication informing customers about the upcoming release date. In this example, the brand manager may type a textual message regarding the date of the upcoming release in editing window 402 and also attach an image of the new shoe by selecting button 408. The successfully uploaded shoe image will appear where image 410 is shown in user interface 400. A published communication at each outlet regarding the new shoe will contain the brand manager's textual message as well as an associated image.

Depending on which platforms the brand manager has selected for publication, the published communication may appear or be displayed differently at the outlets of each platform. For example, a platform such as Facebook directly displays images and rich media on a webpage associated with an associated outlet whereas a platform such as Twitter displays images via link on a webpage associated with an associated outlet. The publication server, such as publication server 204, will accommodate the publication of the communication at each outlet, as if the brand manager had entered the communication directly at the platform associated with the outlet himself. This way, an end user such as a brand manager does not need to spend time to manually tailor his communication to the display requirements of each platform because such actions will be automatically handled in the publishing step and/or without navigating away from this interface (e.g., without having to go to a Facebook webpage or a Twitter webpage). Some embodiments associated with publishing at platforms with different display configurations or requirements are described in FIGS. 14 and 15.

Figure 5:
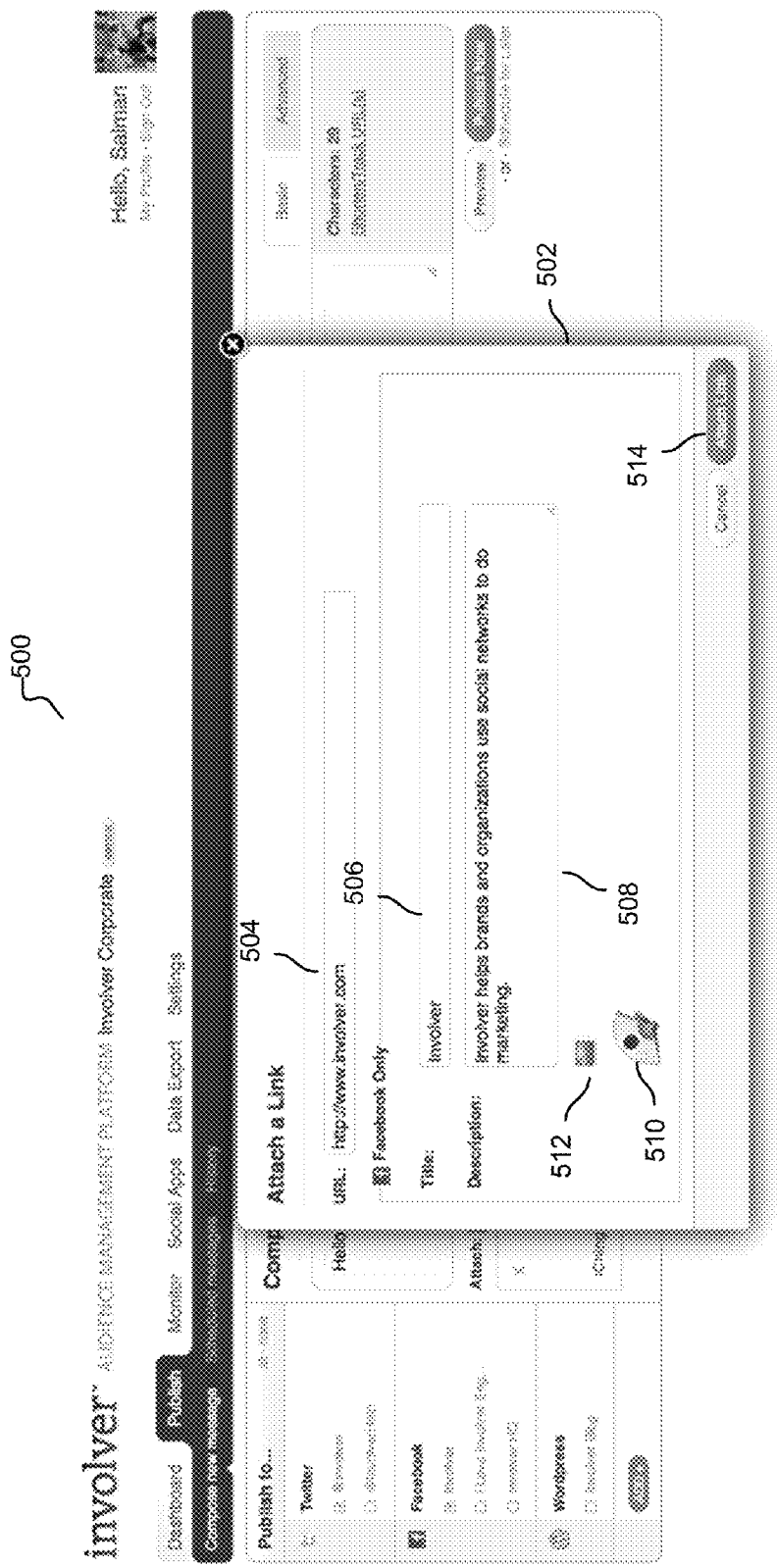
FIG. 5 is a diagram showing an embodiment of a prompt in a user interface presented in response to selecting a link attachment button.

FIG. 5 is a diagram showing an embodiment of a prompt in a user interface presented in response to selecting a link attachment button. In the example shown, user interface 500 is presented in response to selecting link attachment button 412 of FIG. 4. Prompt 502 of user interface 500 presents several fields (e.g., 504, 506, and 508) in which to enter information regarding a link to be attached in a (e.g., initial version of a) communication to be published. URL (Uniform Resource Locator) field 504 may be used to enter in URL information of the link. In some embodiments, the URL entered in field 504 may be shortened and/or tracked. Title field 506 may be used by an end user to enter a desired title of the website pointed to by the link or any other desired name associated to the link. Description box 508 may be used to enter in relevant information to explain the relevance of the link. In some embodiments, an image may also be attached and shown along with the attached link. Image attachment button 512 may be selected to upload an image. The next figure shows an embodiment of a display in a user interface in response to selecting Attach Link button 514. Upon publication or even in a preview of the communication, image 510 will appear next to the link and its associated information.

Figure 6:
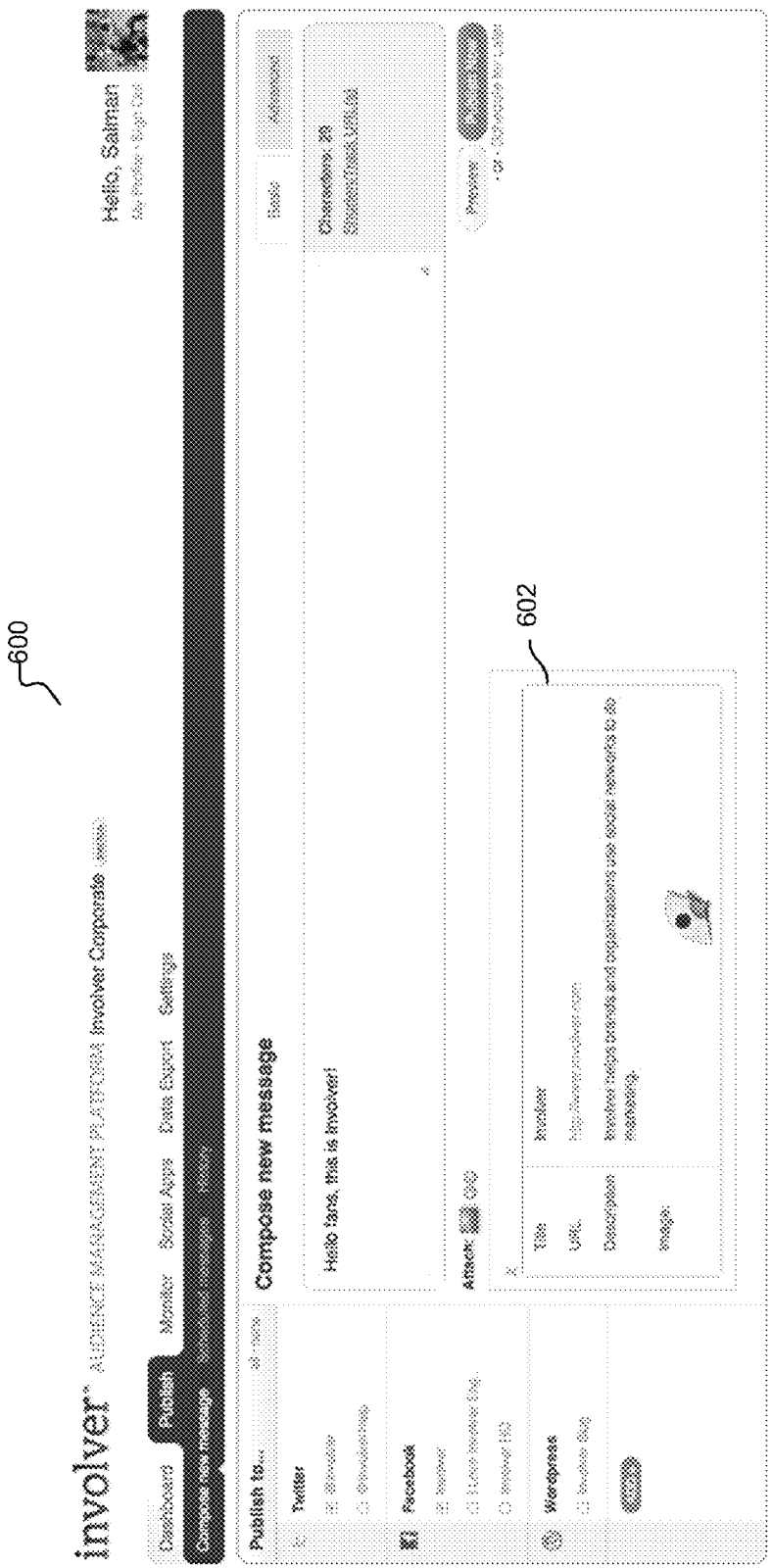
FIG. 6 is a diagram showing an embodiment of a user interface presented in response to attaching a link.

FIG. 6 is a diagram showing an embodiment of a user interface presented in response to attaching a link. In the example shown, user interface 600 is presented in response to selecting Attach Link button 514 in FIG. 5. In the example shown, the information entered at 504, 506, 508, and 512 of FIG. 5 are presented in window 602.

Figure 7:
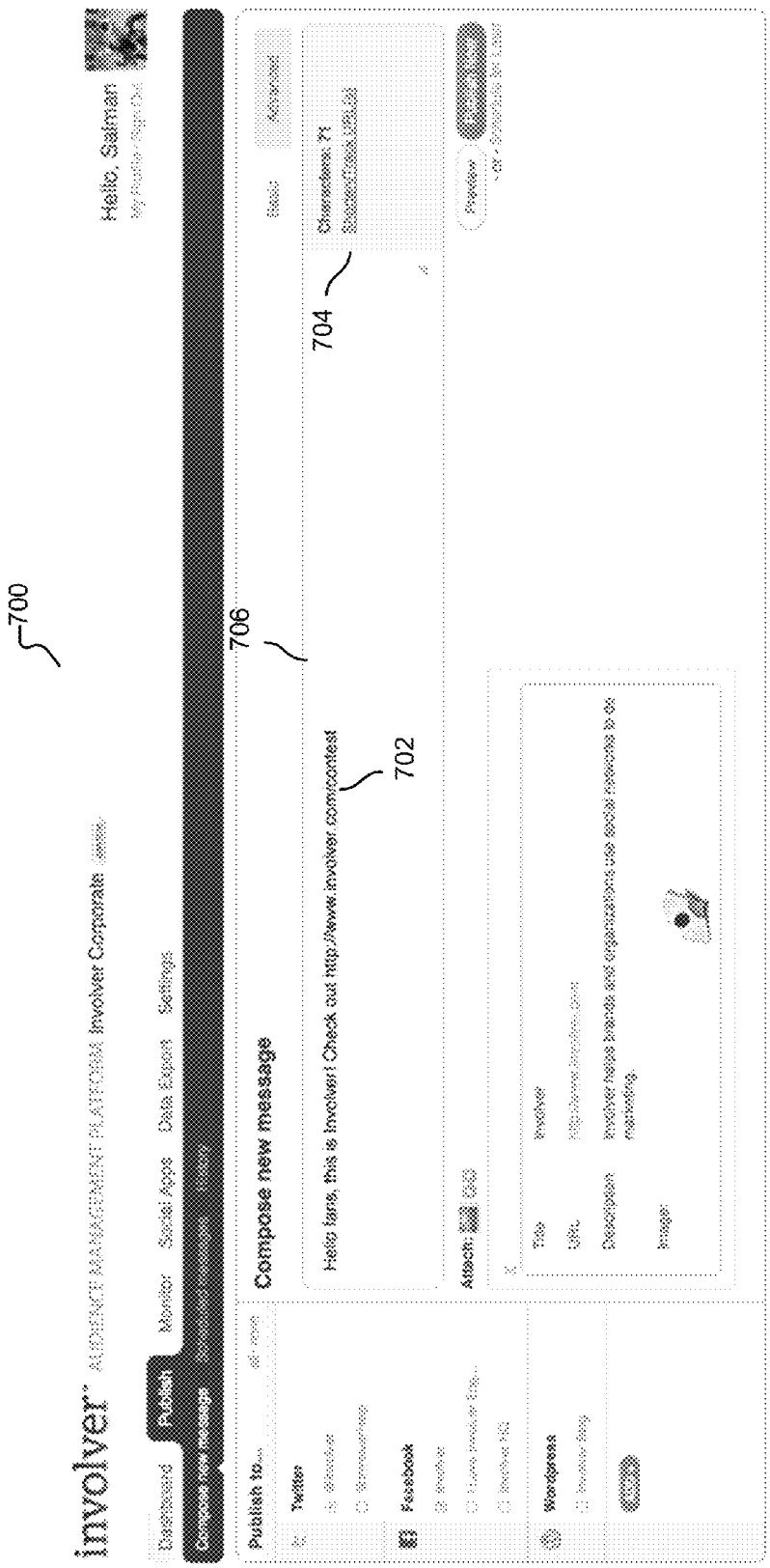
FIG. 7 is a diagram showing an embodiment of a user interface displaying an initial version of a communication which includes a link.

FIG. 7 is a diagram showing an embodiment of a user interface displaying an initial version of a communication which includes a link. In the example shown, user interface 700 includes editing window 706 and shorten and track link button 704. Inside editing window 706 is an initial version of a message 702 which includes a link ("http://www.involver.com/contest/"). In some embodiments, the link within message 702 may appear in its entirety, as shown in FIG. 7. In some embodiments, the link within message 702 may be shortened, for example by selecting shorten and track link button 704 which causes the user interface to inspect message 702 for any URLs and return a URL which is both shortened and embedded with tracking information and/or mechanisms (hereinafter, referred to as "tracking"). Some examples of this are described in further detail below. Although this example shows button 704 associated with both shortening and tracking, in some other embodiments only one process (e.g., only shortening or only tracking) is performed. Shortening links may have the advantages of saving space (e.g., some platforms may have a character limit on the published content).

In some embodiments, pressing shorten and track link button 704 causes a publication server to communicate with an external and/or third-party service which when provided a URL returns a shortened and/or linked URL. In some embodiments, such a service provides customized services and/or support and communication includes logging in and/or identifying which customer the shortening and/or linking service is to be provided for. For example, a company or a brand manager at a company may pay bit.ly or some other third-party service provider for additional services and the login and password of the brand manager and/or the company is provided to the third-party service provider.

In some embodiments, multiple layers of shortening and/or tracking are able to be supported. For example, a publication server (e.g., an Involver server) may provide tracking and/or analytics services for customers and embeds tracking information (to be used by the publication server) into a communication. This already shortened and/or already tracked URL may be passed to bit.ly for bit.ly processing, thus enabling tracking and analytic services to be performed by both bit.ly and the publication server (and for a brand manager or other use to use tracking and analytics related services of both bit.ly and Involver). From the point of view of an outlet viewer, the multiple shortened and/or multiple linked URL works properly and directs the outlet view to the proper webpage. Such multiple layers of shortening and/or tracking may be performed in any order. For example, the bit.ly processing may be the "inner layer" and the Involver process may be the "outer layer" or vice versa.

Figure 8:
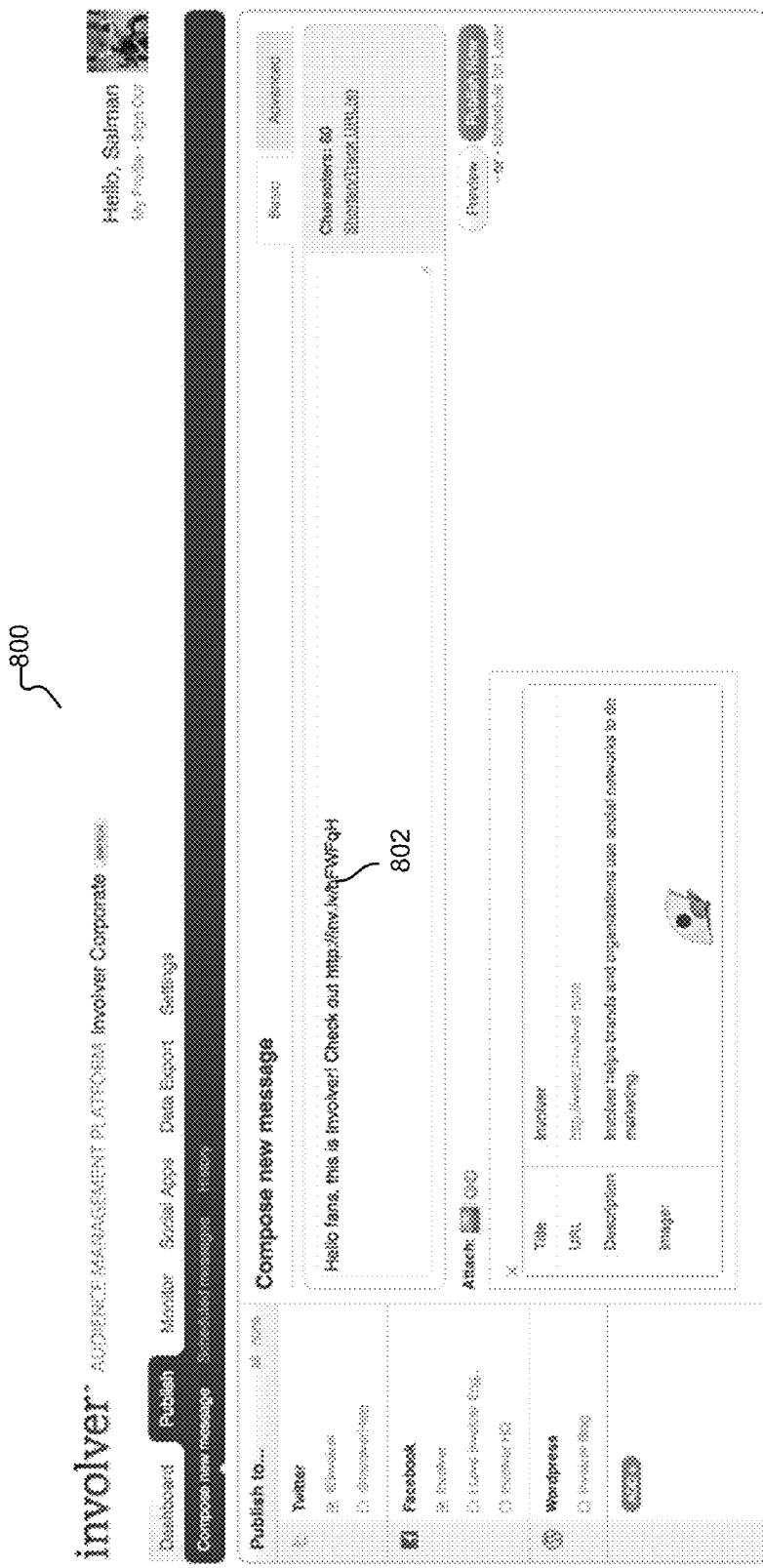
FIG. 8 is a diagram showing an embodiment of a user interface presented in response to selecting a button to shorten and track a link.

FIG. 8 is a diagram showing an embodiment of a user interface presented in response to selecting a button to shorten and track a link. In the example shown, user interface 800 is presented in response to selecting shorten and track link button 704 of FIG. 7. In some embodiments, a shorten and track link button is associated with each editing window. In some embodiment, one editing window is associated with all selected outlets. In other embodiments, one editing window is associated with each outlet. Upon selecting a shorten and track link button, any URLs displayed in the associated editing window(s) appears shortened. As shown in FIG. 8, in response to the selection of a shorten and track link, the URL or link present in the editing window appears as a shortened link or shortened URL 802. A shortened link still points to the same website as it did before the shortening but one advantage to having a shortened link is the condensing of space. One example of a link shortening service is bit.ly, but link shortening can be performed by other services as well.

Figure 9:
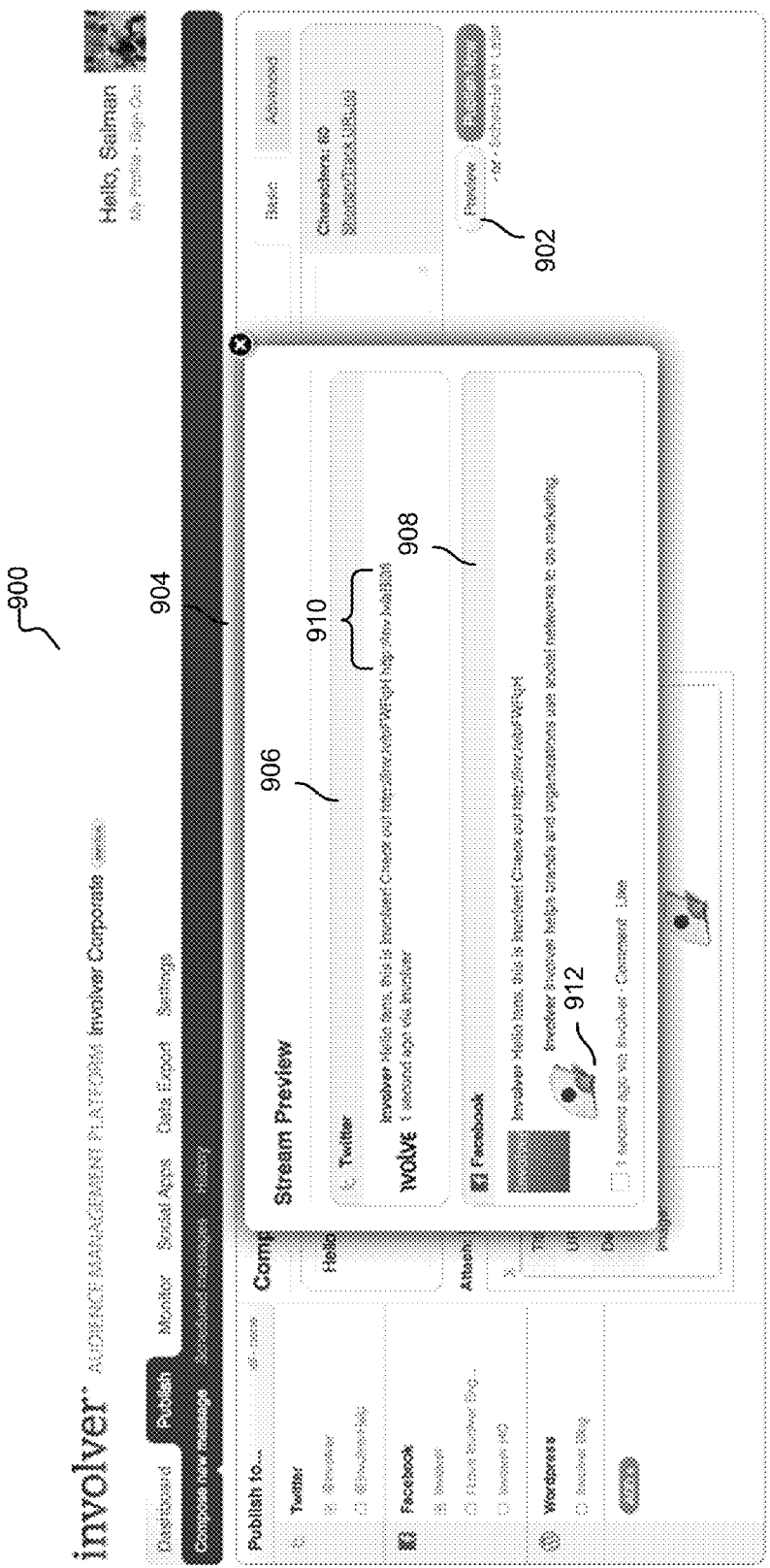
FIG. 9 is a diagram showing an embodiment of previews of a published communication to two outlets.
Figure 14:
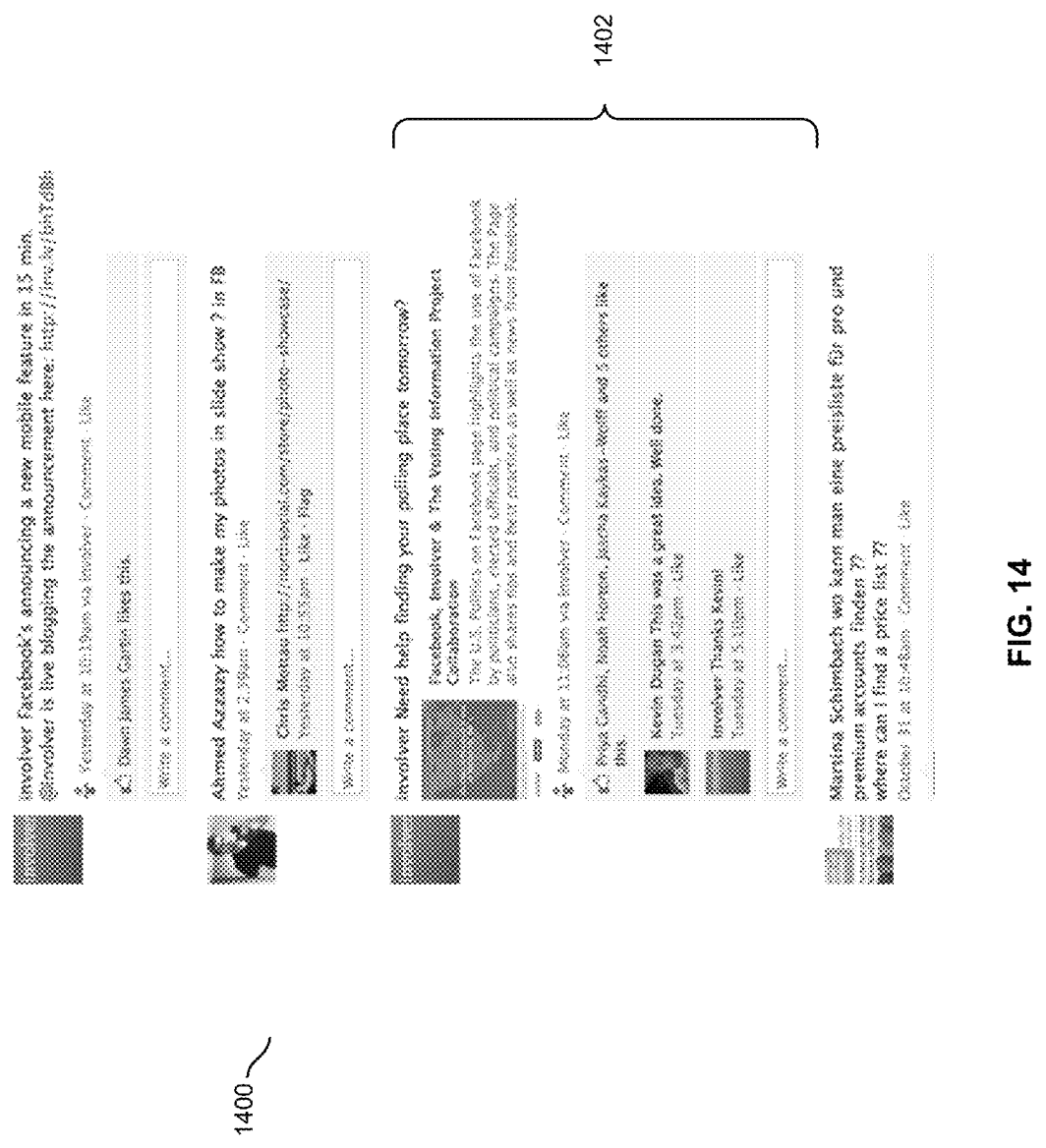
Figure 15:
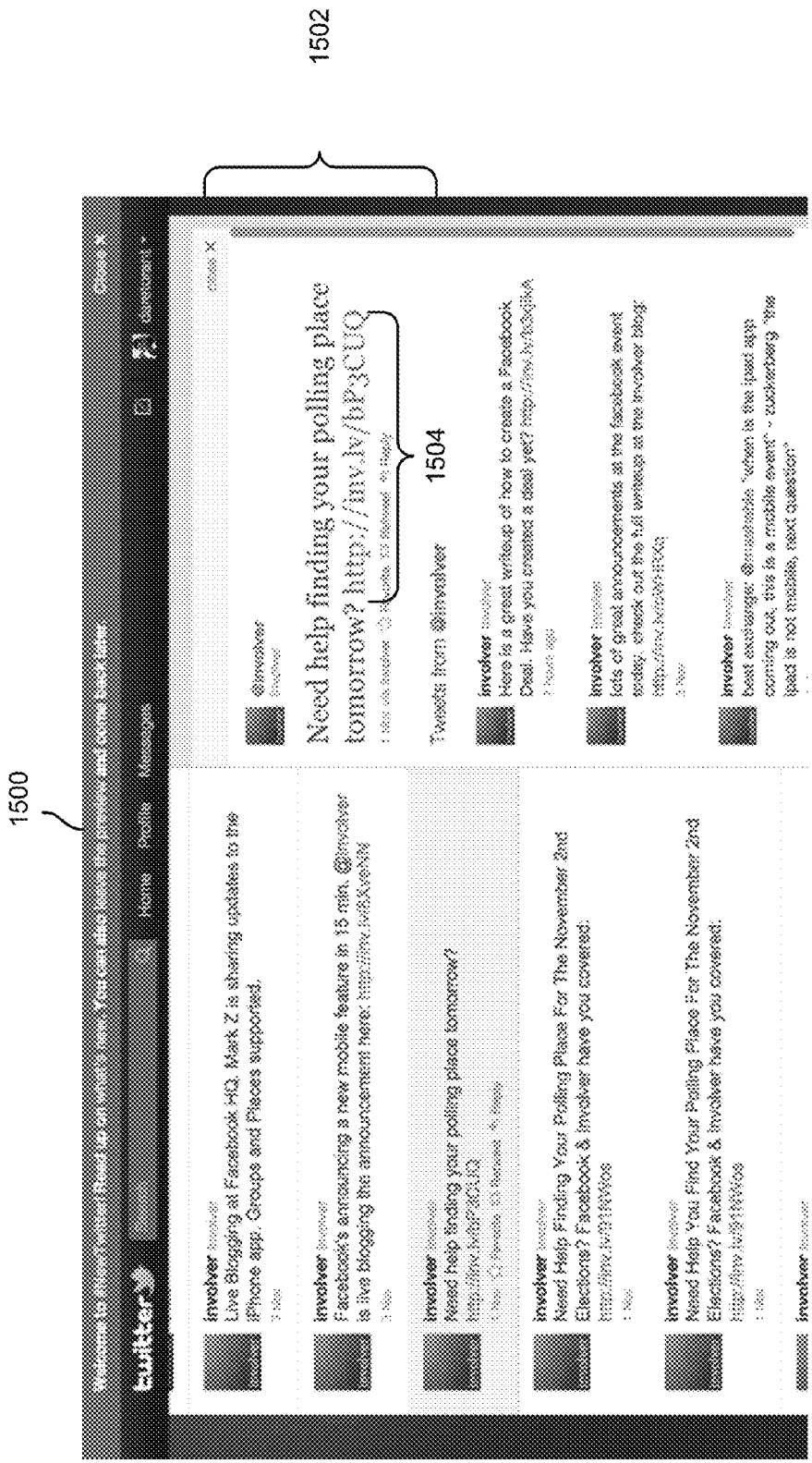
FIG. 15 is a diagram showing an embodiment of a published communication at an outlet at the Twitter platform.

FIG. 9 is a diagram showing an embodiment of previews of a published communication to two outlets. In the example shown, a preview of the publication of the communication to an outlet associated with the "Twitter" platform 906 and a preview of the publication of the communication to an outlet associated with the "Facebook" platform 908 are shown in preview window 904 in user interface 900. As mentioned above, one platform may entail different published appearance features (e.g., font size, location on the page, display of a published image at a separate link) from a second platform depending on the display configurations and requirements of each platform. As such, selecting a preview button such as preview button 902 permits an end user to view previews of the published displays of his desired communication in the form and/or layout that each publication would take on at each of the selected outlets. In some embodiments, selecting a preview button allows an end user to view previews of published communications for all selected outlets at once (such as preview button 902). In some embodiments, selecting a preview button allows an end user to view a preview of the published communication for only one of the selected outlets. (Some embodiments of published communications at selected outlets are shown in FIGS. 14 and 15). In the example shown, the communications of preview 906 and 908 are very similar, except that each published communication preview is automatically tailored to resemble the actual publication appearance at its respective platform. In some embodiments, a publication server contains a module for each platform which renders or otherwise generates a preview for each platform. In some embodiments, such a module is a self-contained preview generator which generates previews locally (e.g., on that device without consulting a remote device). In some other embodiments, such a module communicates with the platform directly and obtains a previews (e.g., via an API). In the example shown, each selected outlet is associated with a different platform, but in some other embodiments, more than one selected outlet may be associated with the same platform.

In preview 908 associated with the Facebook platform, image 912 and its associated metadata (e.g., title of image "Involver" and associated description, "Involver helps brands and organizations use social networks to do marketing") are shown adjacent to the message of "Hello fans, this is Involver!" and the accompanying shortened and tracked link. In contrast, in preview 906 associated with the Twitter platform, neither an image nor its associated metadata are displayed with the same message ("Hello fans, this is Involver!") and its accompanying shortened and tracked link. Instead, the image for preview 906 associated with Twitter can be found on a separate page, the shortened and tracked link for which is shown as shortened link 910. This way, the preview function of a system for customizing a communication for publication across multiple outlets permits an end user the opportunity to see previews of the different publication appearances of a communication at each of the selected outlets before he actually publishes the communication at the outlets.

In some embodiments, a separate page which an exemplary image (e.g., used by a Twitter communication but not necessarily a Facebook communication) is automatically generated and/or hosted by a publication host. For example, a publication server (e.g., or a module in the publication server associated with the appropriate platform such as a Twitter module) may create a page on www.Involver.com that contains the image and the link to that page is included in the exemplary Twitter communication.

Figure 10:
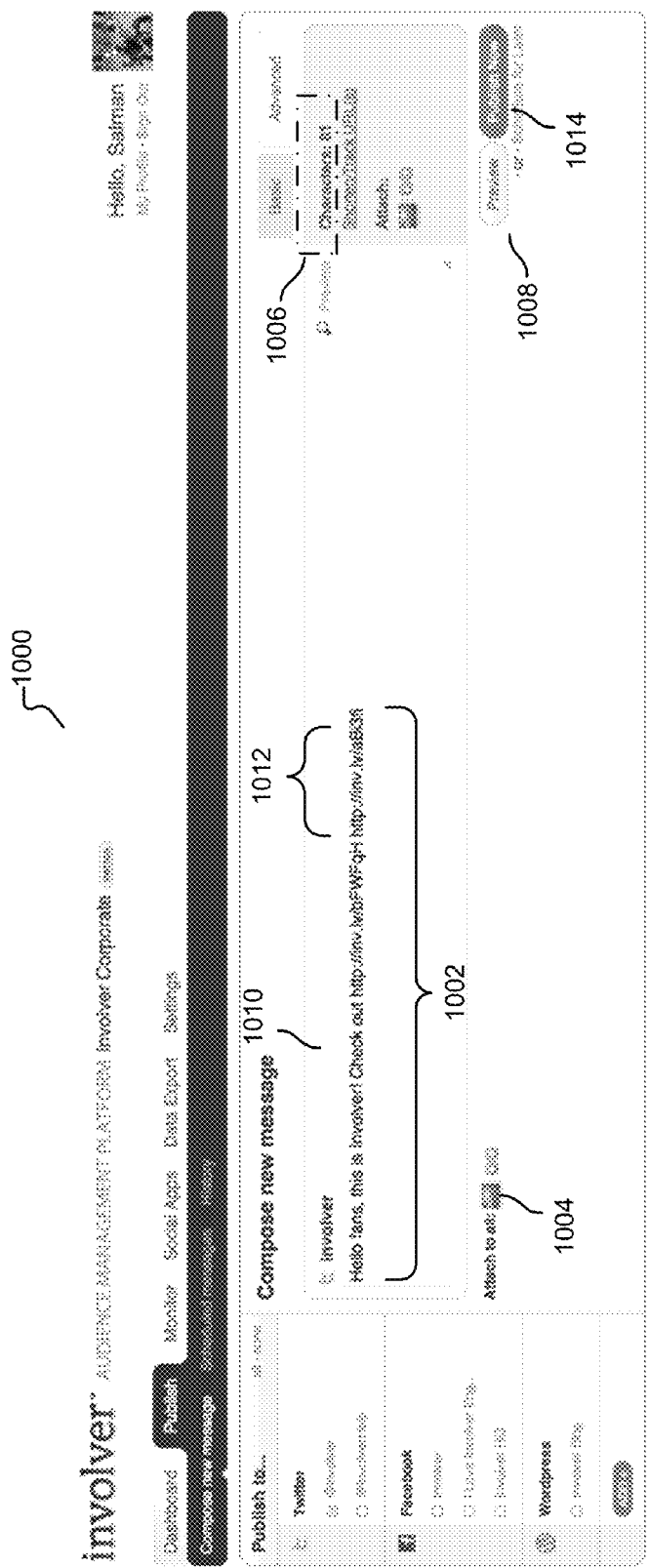
FIG. 10 is a diagram showing an embodiment of an input into editing window for an outlet associated with the Twitter platform.

FIG. 10 is a diagram showing an embodiment of an input into editing window for an outlet associated with the Twitter platform. In the example shown, user interface 1000 shows editing window 1010 for only the outlet "@involver" that is associated with the Twitter platform. As mentioned above, each platform may entail different published appearance features and requirements. In the example shown, publication at one or more outlets associated with the Twitter platform entails at least two particular features. The first feature is that an attached image to the communication will appear as an appended shortened link inside the editing window. As can be seen in exemplary user interface 1000, an image (not shown) has already been attached to the communication by virtue of an end user selecting attach image button 1004 (also see example of attaching an image in FIG. 4). To accommodate the publication appearance requirements for images of the Twitter platform, upon receiving the selected image to be attached, user interface 1000 will append a shortened and tracked link 1012 in editing window 1010 that links to a separate webpage that will contain the attached image.

The second feature is that a communication in an editing window may not exceed a certain length of characters. In the example shown, the character limit is 140 characters. User interface 1000 includes character counter 1006 that indicates the current number of characters present in editing window 1010. The benefit of character counter 1006 is that it indicates to an end user how many characters he has so far used so that he may edit his communication to stay within the publishable limit but still convey his intent. The character limit includes the text entered into editing window 1010 (e.g., "Hello fans, this is Involver! Check out") the characters of any included link (e.g., "http://inv.lv/bFWqH") and the characters of any appended link to an attached image (e.g., shortened link 1012 "http://inv.lv/aBi3fi" for an attached image). In some embodiments, upon selecting a preview button (e.g., preview button 1008) associated with an editing window for an outlet for Twitter, if the value of the character counter has exceeded the character limit, the end user may receive a prompt indicating that the communication in the editing window has exceeded the allowed character limit (not shown).

Figure 11:
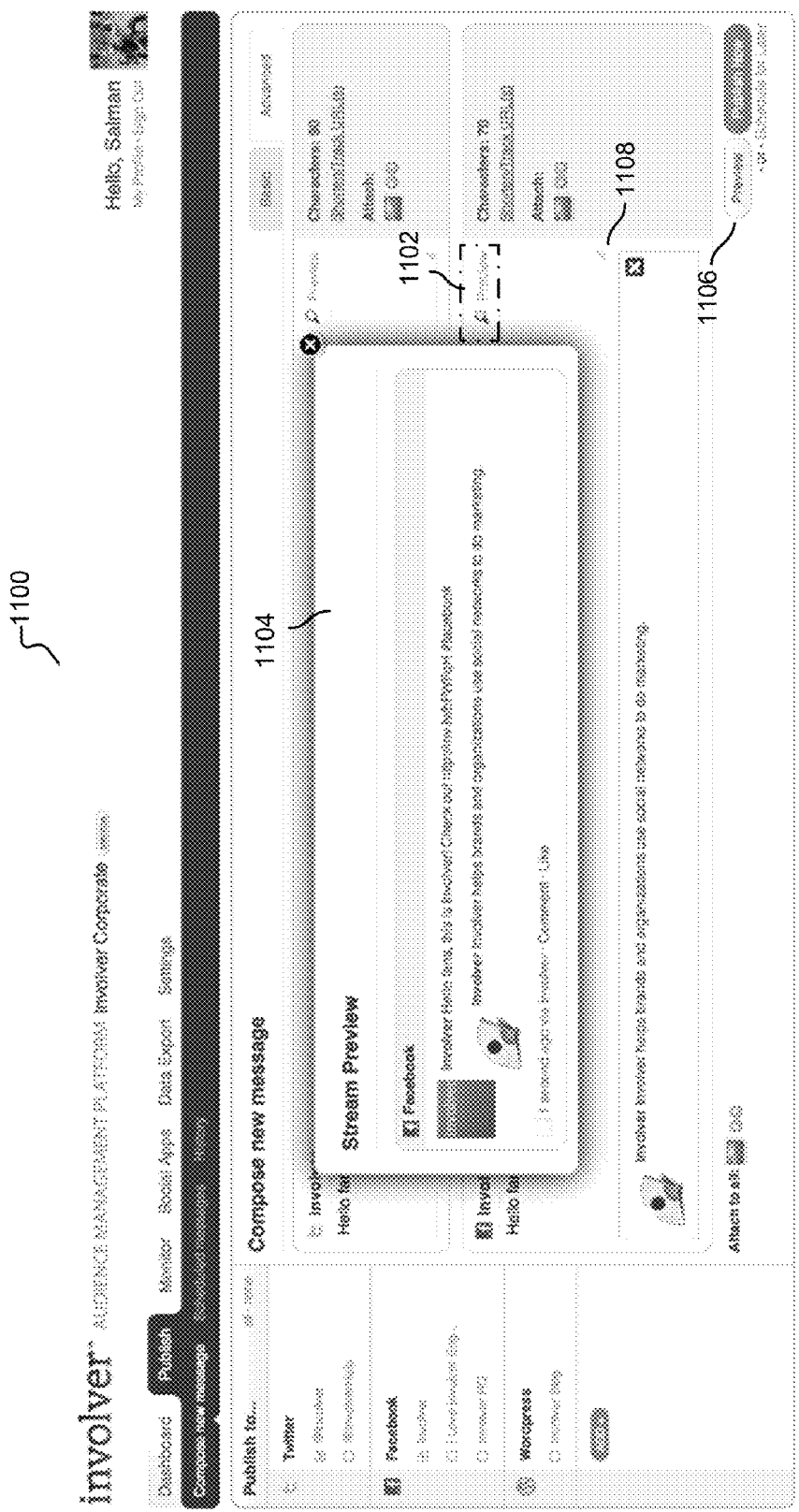
FIG. 11 is a diagram showing an embodiment of a preview for only one of the selected outlets.

FIG. 11 is a diagram showing an embodiment of a preview for only one of the selected outlets. As mentioned above, in some embodiments, selecting a preview button allows an end user to view previews of published communications for all selected outlets at once (see example of FIG. 9), while in some embodiments selecting a preview button previews the published communication for only one of the selected outlets. In the example shown, user interface 1100 shows published communication preview 1104 for only the "Involver" outlet associated with the Facebook platform. In this particular example, a separate preview button is associated with each editing window for each outlet. In the example shown, preview button 1102 is associated only with editing window 1108 for the outlet "Involver" associated with the Facebook platform. Upon selecting preview button 1102, whatever communication (e.g., text inside the editing window and any attached links or images) is associated with the outlet is shown in preview box 1104 as a preview of its published appearance at the outlet at the Facebook platform. This preview function for individual outlets permits an end user to focus on customization for only one outlet at a time, if he so desires. However, if the end user wishes to preview the published appearances of the communication at all selected outlets at once, he can just select preview button 1106 of exemplary user interface 1100.

Figure 12:
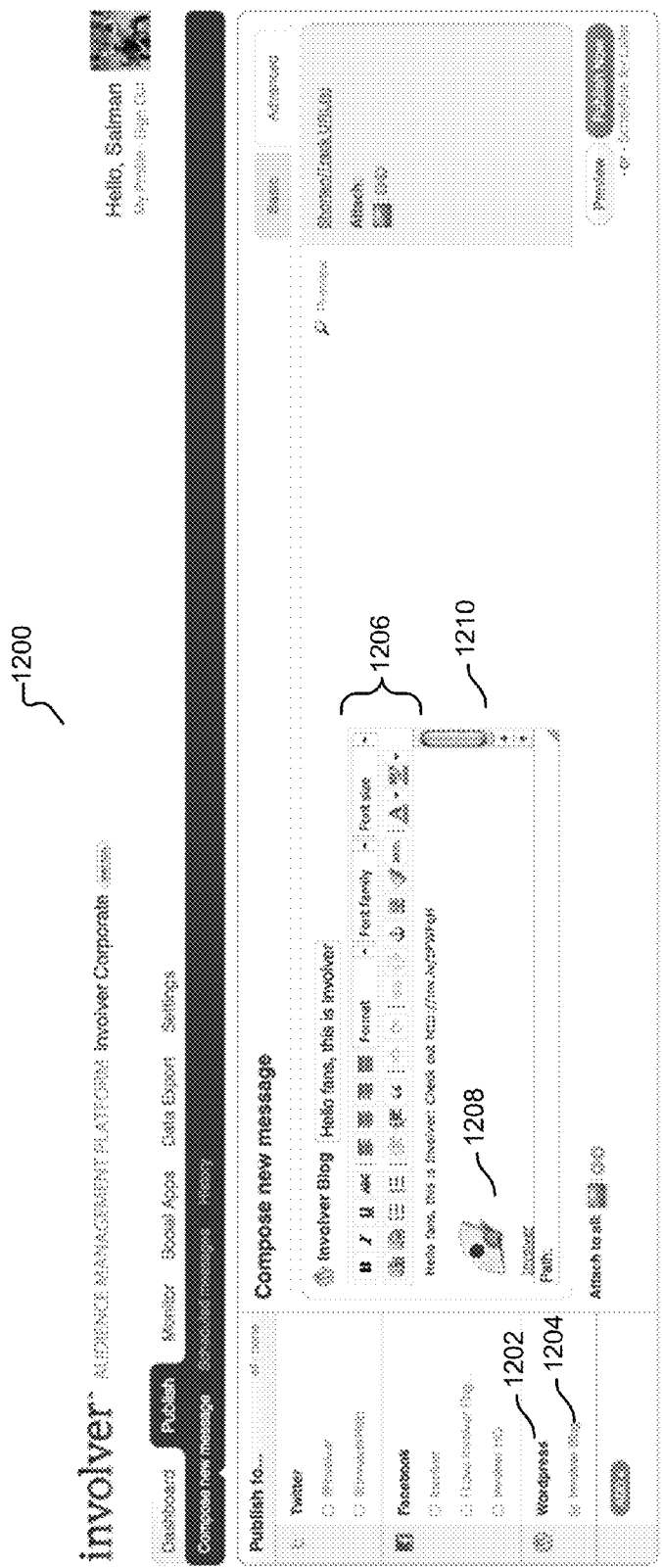
FIG. 12 is a diagram showing an embodiment of customizing a communication for an outlet associated with the Wordpress platform.

FIG. 12 is a diagram showing an embodiment of customizing a communication for an outlet associated with the Wordpress platform. In the example shown, outlet "Involver Blog" 1204 associated with Wordpress platform 1202 is selected. Editing window 1210, including certain layout, format and/or publishing tools associated with the Wordpress platform, is presented in response to the selection of outlet 1204. Tool bar 1206 includes functionalities that an end user may use to format text, to insert links or images, or to embed various forms of media directly in editing window 1210. For example, an end user can insert a piece of rich media, such as a link and/or an image and associated metadata (e.g., "Involver" tag) 1208 directly into editing window 1210.

FIG. 13A is a diagram showing an embodiment of publication modules included in a publication server. In some embodiments, the system of FIG. 13A is used in conjunction with the embodiment of FIG. 13B. In the example shown, system 1300 includes content publication module 1302, Facebook publication module 1304, Twitter publication module 1306, and link shortener module 1308. While only Facebook publication module 1304 and Twitter publication module 1306 are shown in the example in FIG. 13A, any number and/or types of platform publication modules may be included. In some embodiments, system 1300 may be a part of a publication server in a system for customizing a communication for publication across multiple outlets, such as publication server 204 of FIG. 2. As mentioned above, a platform is any platform to which communications can be published. Examples of platforms include, but are not limited to, Twitter, Facebook, Wordpress or a smart phone application. Each of content publication module 1302, Facebook publication module 1304, Twitter publication module 1306, and link shortener module 1308 may be implemented by a combination of software and/or hardware and may comprise of one or more devices.

FIG. 13B is a diagram showing a system which stores authentication information for various outlets associated various platforms. In some embodiments, system 1320 is part of a publication server. System 1320 may be implemented as a data structure or as a software program that retrieves authentication information for one or more selected outlets. As mentioned above, an outlet may be an account at a platform. To gain access to publish at an outlet (if needed), authentication must be established via a submission of login and password information and/or a third party authentication service.

Regardless of the specific method of authentication to be used, outlet authentication storage 1320 stores authentication information (e.g., tokens, login and password information, credentials, etc.) for each of the outlets that may be selected for a system for customizing a communication for publication across multiple outlets. In the example shown, outlet authentication information storage 1320 includes outlet authentication information that may be organized by all the platforms that are associated with the system. In the example shown, platforms Facebook 1322, Twitter 1324, Platform X 1334, among others (not shown), are associated with the system. Platform Facebook 1322 is associated with outlets "Involver" 1326 and "Involver HQ" 1328. Platform Twitter 1324 is associated with outlets "Involver" 1330 and "InvolverHelp" 1332. For example, authentication information of each outlet may be stored with an outlet identification (e.g., name of the outlet) and/or with a platform identification (e.g., name of the platform). As an example, authentication information for outlet "Involver" 1326 platform Facebook 1324 may be stored with the platform identification associated with "Facebook" and/or an outlet identification associated with "Involver."

Returning to FIG. 13A, content publication module 1302 may apply certain basic processing to a communication (e.g., received by a user interface provided by a publication server). The communication may include text, images, and links, among other things. Basic processing may include separating the communication into text, images and links and any other applicable categories. Basic processing may also include calling link shortener module 1308 to inspect the communication for any shortened links to expand, apply another layer of tracking, and reshorten any detected shortened links.

After the communication is processed by content publication module 1302, the appropriate platform publication modules for the appropriate platforms (e.g., associated with the outlets selected by an end user at a user interface provided by the publication server) are used to publish the communication at each selected outlet. Each platform publication module retrieves the authentication information for its respective selected outlets (e.g., from a storage of outlet authentication information of FIG. 13B) and establishes communication with each of the outlets to perform authentication as needed. Each platform publication module then communicates with the application programming interface ("API") of the corresponding platform, translates the communication to accommodate the specific features and requirements of the platform, and instructs the platform's API's to publish the communication. Examples of translating the communication may include, but is not limited to, the following: creating a separate webpage at which the attached image is displayed and including the link to the separate page in the communication, applying font stylizations to the text of the communication, arranging the location of an image and its associated metadata (e.g., the image is always placed on the left in a published display with its associated metadata).

An example of using a system of publishing content and an outlet authentication storage system may be described in reference to the example of FIG. 10. Returning to FIG. 10, outlet "Involver" is associated with the Twitter platform, is selected by an end user to which he desires to publish a communication. Authentication information for outlet "Involver" is stored in an outlet authentication storage system (e.g., the embodiment of FIG. 13B). After the end user enters his desired message and link into editing window 1010 and attaches an image to the communication, he may select "Publish Now" button 1014 to publish the communication immediately. Upon selecting the "Publish Now" button 1014, content publication module 1302 scans the communication for the shortened links to expand, apply another layer of tracking to and reshorten the expanded link. Content publication module 1302 may also sort the communication into categories of text, links/URLs, and image. Twitter publication module 1306 retrieves the authentication information for outlet "Involver" from storage and establishes authentication for the outlet at the Twitter platform. Alternatively, in some embodiments, authentication is performed a priori (e.g., even if there is no pending communication which needs to be published immediately) and the outlet is "logged on" relatively continuously. Twitter publication module 1306 receives the processed communication from content publication module 1302 and performs a translation of the communication, including (for example and as needed) creating a separate webpage for the attached image, appending a shortened and tracked link to the separate webpage to the communication, and verifying that the characters in the communication do not exceed the character limit of 140 characters that is associated with the Twitter platform. After performing the translation, Twitter publication module 1306 communicates with an API at the Twitter platform (e.g., running on a server managed by Twitter) to publish the translated communication. The published communication at the outlet will include all the desired content of the end user's communication but will be tailored to the Twitter platform.

FIG. 14 is a diagram showing an embodiment of a published communication at an outlet at the "Facebook" platform. In the example shown, communication 1402 is published at the "Involver" outlet of the "Facebook" platform. As can be seen, communication 1402 contains a title ("Need help finding your polling place tomorrow?"), a link (displayed as a selectable title of the linked webpage, "Facebook, Involver & The Voting Information Project Collaboration"), an image associated with the link, and a description associated with the linked webpage. Prior to publication, communication 1402 has been translated by its associated Facebook publication module to accommodate to the publication/display requirements at the Facebook platform.

FIG. 15 is a diagram showing an embodiment of a published communication at an outlet at the Twitter platform. In the example shown, communication 1502 contains the same content as communication 1402 of FIG. 14, only that communication 1502 appears differently because the same communication was translated by a Twitter publication module to accommodate the publication/display requirements at the Twitter platform prior to the publication of communication 1502. Although the text of communication 1402 and communication 1502 are similar, the link, associated image and description are not visible in communication 1502 but are included in communication 1502 as appended, shortened link 1504. Appended, shortened link 1504 links to the same webpage as pointed to by the original link attached to the communication. As such, FIGS. 14 and 15 illustrate one example of how the same communication may be automatically tailored by the system to be published at outlets associated with different platforms.

Figure 16:
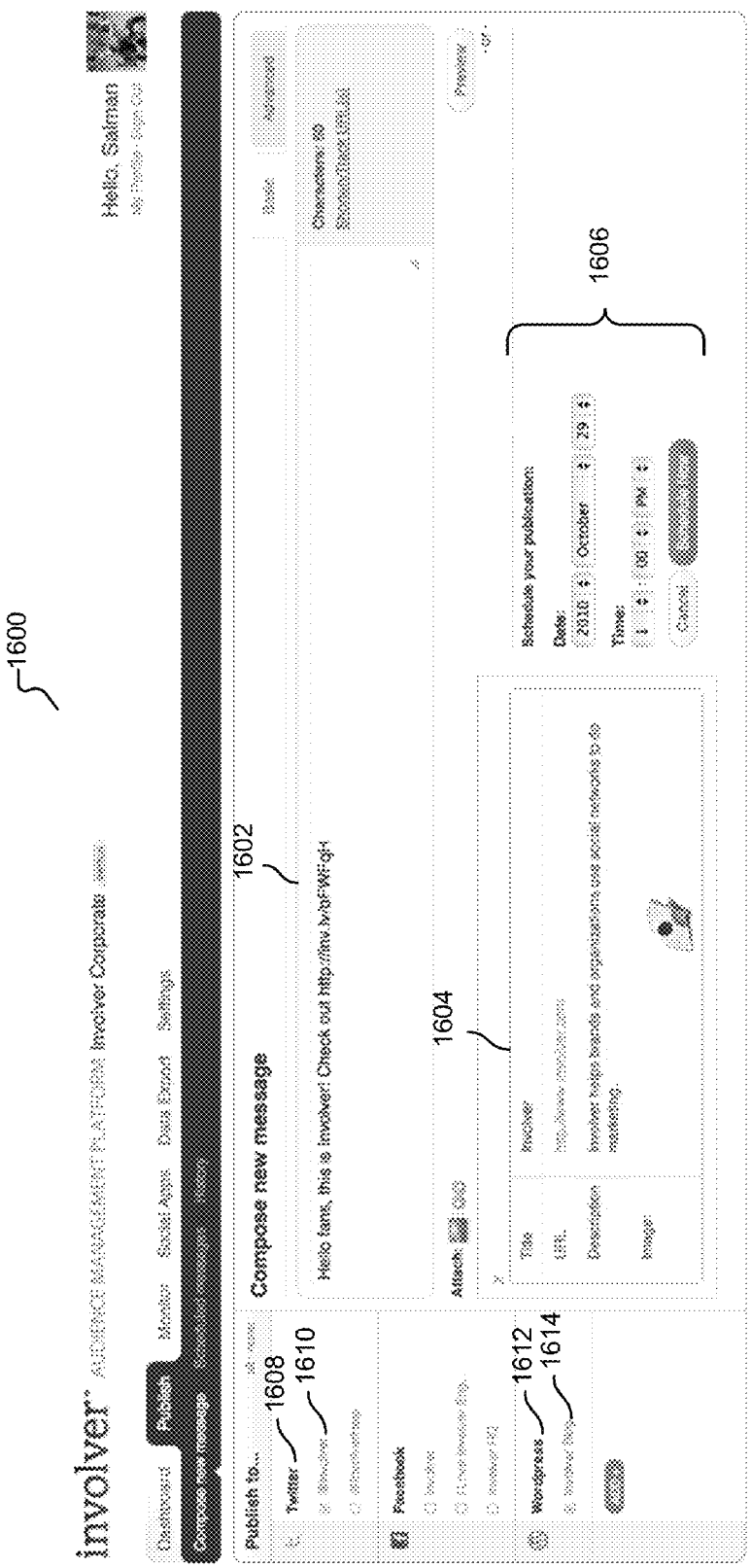
FIG. 16 is a diagram showing an embodiment of a user interface that includes an option to schedule a publication of a communication for a future time.

In the examples of FIGS. 15 and 16, a user (such as a brand manager) is able to publish communications 1402 and 1504 from a single interface without navigating away or leaving a user interface associated with a publication server. From the point of view of the brand manager, this is more convenient than having to go to each platform, login to a specific account (e.g., the "Involver" account on Facebook versus the "Involver HQ" account on Facebook), manually re-enter the communication. A number of errors may arise, such as forgetting one of the outlets, duplicate communications on a given outlet, undesired differences in communications between two outlets, etc.

Figure 18:
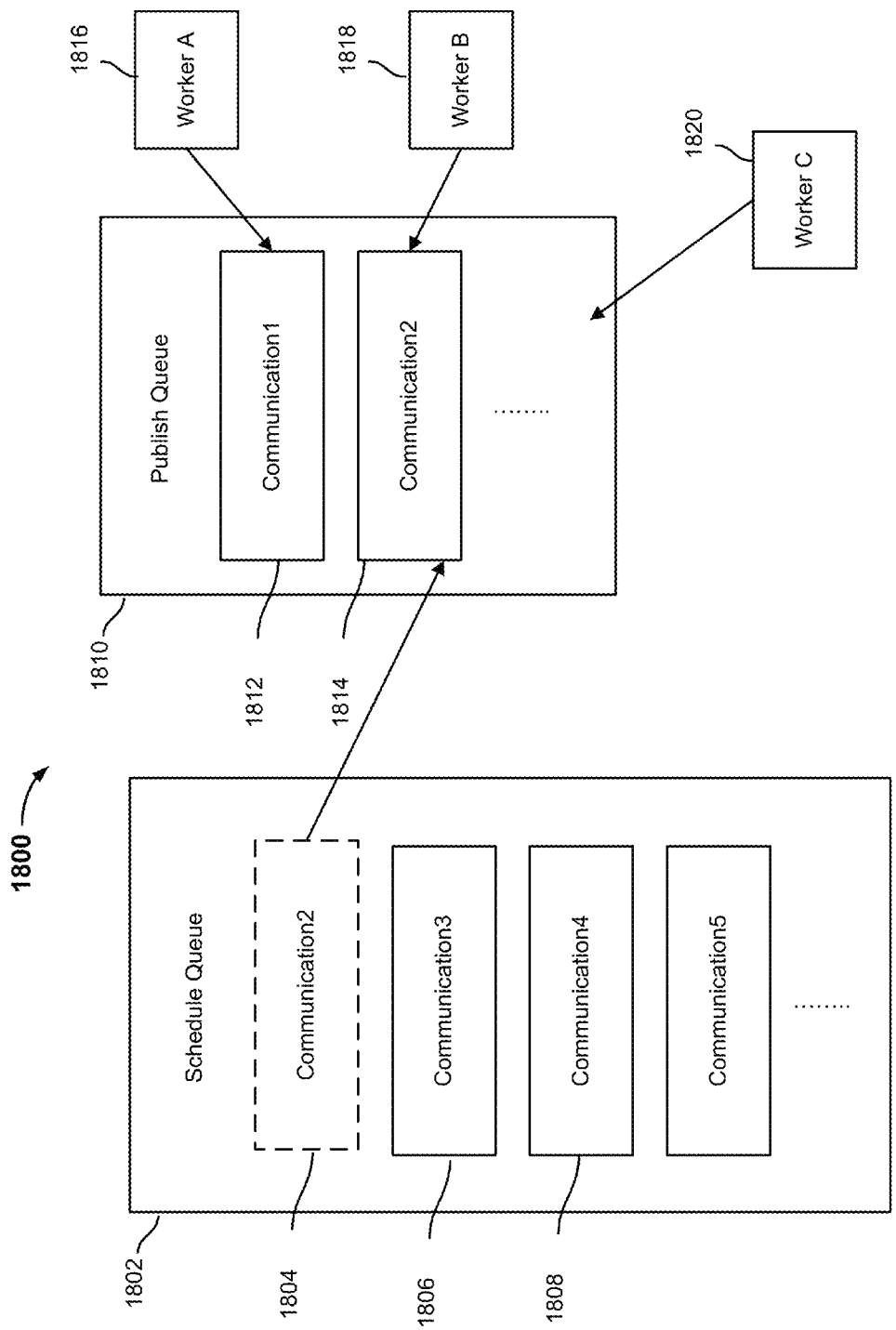
FIG. 18 is a diagram showing an embodiment of a system for managing and storing scheduled communications.

FIG. 16 is a diagram showing an embodiment of a user interface that includes an option to schedule a publication of a communication for a future time. In the example shown in FIG. 16, user interface 1600 includes scheduling fields 1606. Similar to previous examples of customizing a communication for publication across various outlets, in the example shown, outlet "@involver" 1610 for platform Twitter 1608 and outlet "Involver Blog" 1614 for platform "Wordpress" 1612 are selected as outlets to which an end user desires to publish a communication. The communication to be published includes a message and link entered into editing window 1602 and attached link with an associated image 1604. Scheduling fields 1606 permit an end user to enter in a specific time and date at which to schedule the publication of the communication to the selected outlets in the future. A separate copy of the communication to be published is stored with its scheduled publication time for each of the selected outlets. In some embodiments, the communications are stored in a database in the chronological order of their respective scheduled publication times. In some embodiments, the stored copies of the communication have already been translated by its appropriate platform publication module to accommodate to the API of the platform (e.g., a communication scheduled to be published at a Facebook outlet is translated by the Facebook publication module). One embodiment of a scheduling system is shown in FIG. 18.

In some embodiments, communications to be published (e.g., either immediately or at a scheduled time) may include a state. For a communication scheduled to be published at a future time, the communication may include a state that indicates the time at which it will be published. For a communication that is to be published immediately, the communication may include a state that indicates its availability for publication as soon as possible (e.g., a value or time of zero or a maximum value/time).

In some embodiments, a system for customizing a communication for publication across multiple outlets may permit an end user to select a time zone to which the end user (e.g., a brand manager setting up the communication) belongs. The selected time zone will be considered as the local time zone. As a result, the system will publish scheduled communications based on the scheduled times according to the set local time zone. Alternatively, the specified time zone may be a reference time zone where the end user is not necessarily located there. For example, the brand manger may be in California but the specified time zone is set to the Eastern time zone.

Figure 17:
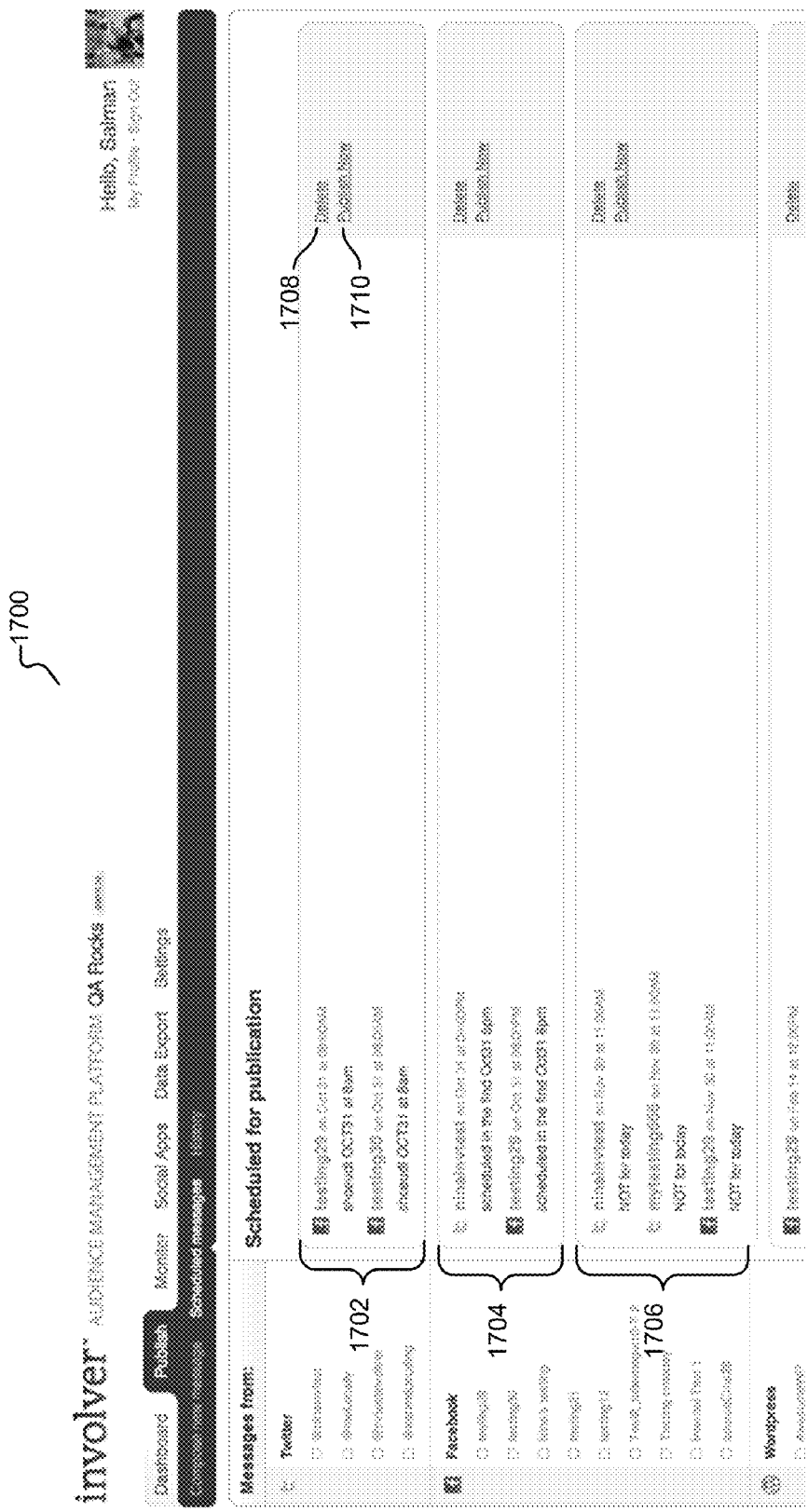
FIG. 17 is a diagram showing a display of a list of various communications scheduled to be published at selected outlets and their respective scheduled publication times.

FIG. 17 is a diagram showing a display of a list of various communications scheduled to be published at selected outlets and their respective scheduled publication times. In the example shown in FIG. 17, display 1700 is presented when tab scheduled message is selected. Display 1700 includes three sets of communications (e.g., 1702, 1704, and 1706) to be published at three future times. As can be seen in FIG. 17, for a given group, communications in that group are scheduled to be published across one or more outlets at the same time (e.g., in set 1702, the communication is set to be published at two different "Facebook" outlets at the same time). The scheduled time for publication for each communication set is indicated next to the name of each outlet. Also, on the right of each set of communications are options to either delete the communication scheduled for publication (e.g., 1708) or to publish the communication at the selected outlets immediately (e.g., 1710). In some embodiments, in the event that the option to "Publish now" is selected, the associated communication will not be published again at the originally scheduled time (as this would result in a duplicate). In some embodiments, in the event the option to "Publish now" is selected, the included state of the communication will change from the originally scheduled time of publication to one that indicates immediately or as soon as possible (e.g., a scheduled publish time is change to a value which causes the system to publish it immediately).

FIG. 18 is a diagram showing an embodiment of a system for managing and storing scheduled communications. In some embodiments, system 1800 is included in a publication server. System 1800 may be implemented through software or hardware or a combination of both, on one or more devices. In the example shown in FIG. 18, schedule queue 1802 is a queue of communications (e.g., 1804, 1806, and 1808) stored with their respective scheduled times of publication. In some embodiments, the communications (e.g., 1804, 1806, and 1808) are stored with their associated outlet and platform identification information. In some embodiments, all the stored communications in schedule queue 1802 are to be published within a particular window of time (e.g., within 24 hours). In some embodiments, the stored communications within schedule queue 1802 may be associated with one or more platforms. In some embodiments, each stored communication is to be published at one outlet.

In the example shown, the stored communications within schedule queue 1802 are arranged in chronological order from top to bottom, in terms of each stored communication's scheduled publication time. As such, the communication with the earliest scheduled publication time appears at the top of the queue, e.g., Communication2 1804, followed by the communication with next earliest scheduled publication time, e.g., Communication3 1806, and so forth.

Periodically (e.g., every 30 seconds), publish queue 1810 polls schedule queue 1802 to determine whether any of the stored communications of the schedule queue 1802 is available to be immediately published (i.e., when the time at the local time zone arrives at the scheduled time for publication of a stored communication). When a stored communication is available to be published immediately, the communication is popped from the top of schedule queue 1802 and pushed to the end of publish queue 1810. As such, the stored communication with the earliest publication time that has passed (e.g., Communication1 1812) appears at the top of publish queue 1810 and is followed by the stored communication with the next earliest publication time that has passed (e.g., Communication2 1812). Publish queue 1810 contains a list of stored communications (e.g., 1812 and 1814) that may be published immediately or as soon as possible. For example, as shown in FIG. 18, because the time at the local time zone arrived at the stored scheduled publication time of Communication2 1804, Communication2 1804 was popped off the top of schedule queue 1802 and pushed onto publish queue 1810 (e.g., at the end).

Workers are each (e.g., independently) instructed to publish stored communications of the publish queue 1810, starting from the stored communication at the top of the queue (e.g., the stored communication with the earliest publication time that has passed). While there are three workers (e.g., Worker A 1816, Worker B 1818, and Worker C 1818) shown in FIG. 18, the system of scheduling communications to be published at a later time and publishing the scheduled communications may include more or fewer workers. Each worker will attempt to publish the next stored communication in publish queue 1810 that is not already being published by another worker. A worker publishes or attempts to publish a stored communication to its associated outlet (e.g., as indicated by an outlet identification stored with the communication) at its associated platform (e.g., as indicated by a platform identification stored with the communication). A worker is not limited to publishing at only one outlet or at only one platform. In this example, a worker publishes a stored communication by translating the communication to accommodate the display configurations of the associated platform (if the communication has not already been translated) and instructing the API at the platform to publish the translated communication. In the event that publication at an outlet is not successful (e.g., the API at the platform is down), then the worker will re-attempt to publish the communication at the outlet until publication is successful. In the event a worker fails to successfully publish a stored communication at one outlet, if the same communication is to be published at the same at another outlet by another worker, the latter publication is not affected by the former. An advantage of having a worker individually publish a stored communication for a given outlet is that a stall in its publication (e.g., an API is down at the associated platform or other problems arise at the associated platform) will not negatively affect the publication of stored communications for other outlets (e.g., outlets associated with correctly functioning platforms).

Figure 19:
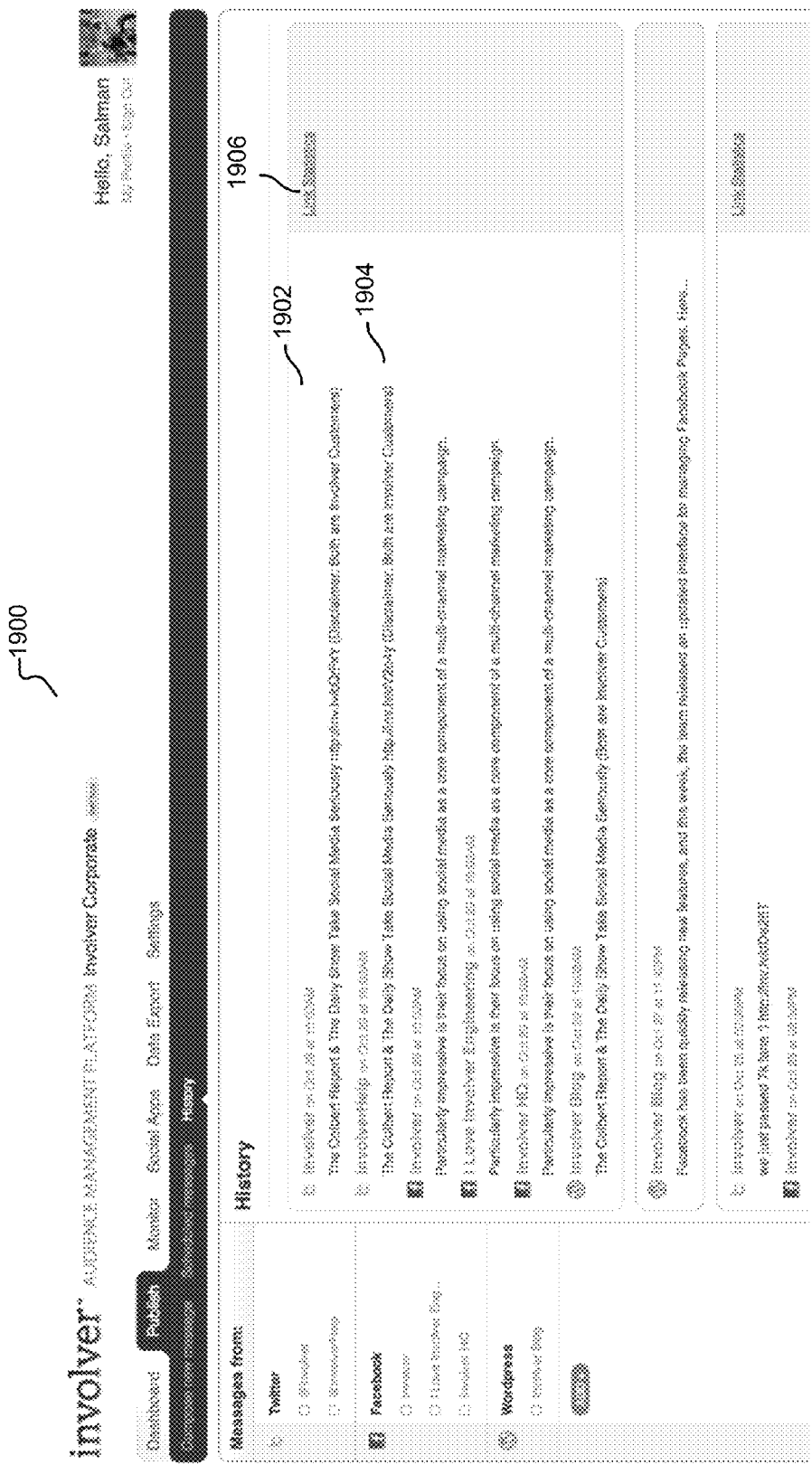
FIG. 19 is a diagram showing an embodiment of a display of a history of already published communications at their respective outlets and platforms.

FIG. 19 is a diagram showing an embodiment of a display of a history of already published communications at their respective outlets and platforms. In the example shown, display 1900 is presented when the history tab is selected. Display 1900 includes a list of communications that have already been published to various outlets. Display 1900 shows the list of the history grouped by the dates of publication but the list may be grouped by other categories (e.g., outlet or platform) as well. As can be seen in FIG. 19, some of the published communications included a shortened and tracked link (e.g., 1902 and 1904). Selecting link statistics 1906 will permit an end user to see the tracked analytics (e.g., number of clicks per tracked link) of all the tracked links within a particular group (e.g., all communications published within the same 24 hours), as further explained below.

Display 1900 groups communications that are related to each other. In this example, the first group includes 6 related communications, each of which is customized as desired to varying degrees. For example, the Involver and Involver-Help outlets on Twitter have the same content (i.e., "The Colbert Report & The Daily Show Take Social Media Seriously") with minor modifications whereas the outlets associated with Facebook have relatively different content (i.e., "Particularly impressive is their focus on using social media as a core component of a multi-channel marketing campaign."). The second group includes a single communication and the third group includes at least two related communications. Presenting related communications together as a group enables an end user (e.g., a brand manager) to quickly assess which outlets a particular communication was distributed on with at least a sampling of the content of the communication.

Figure 20:
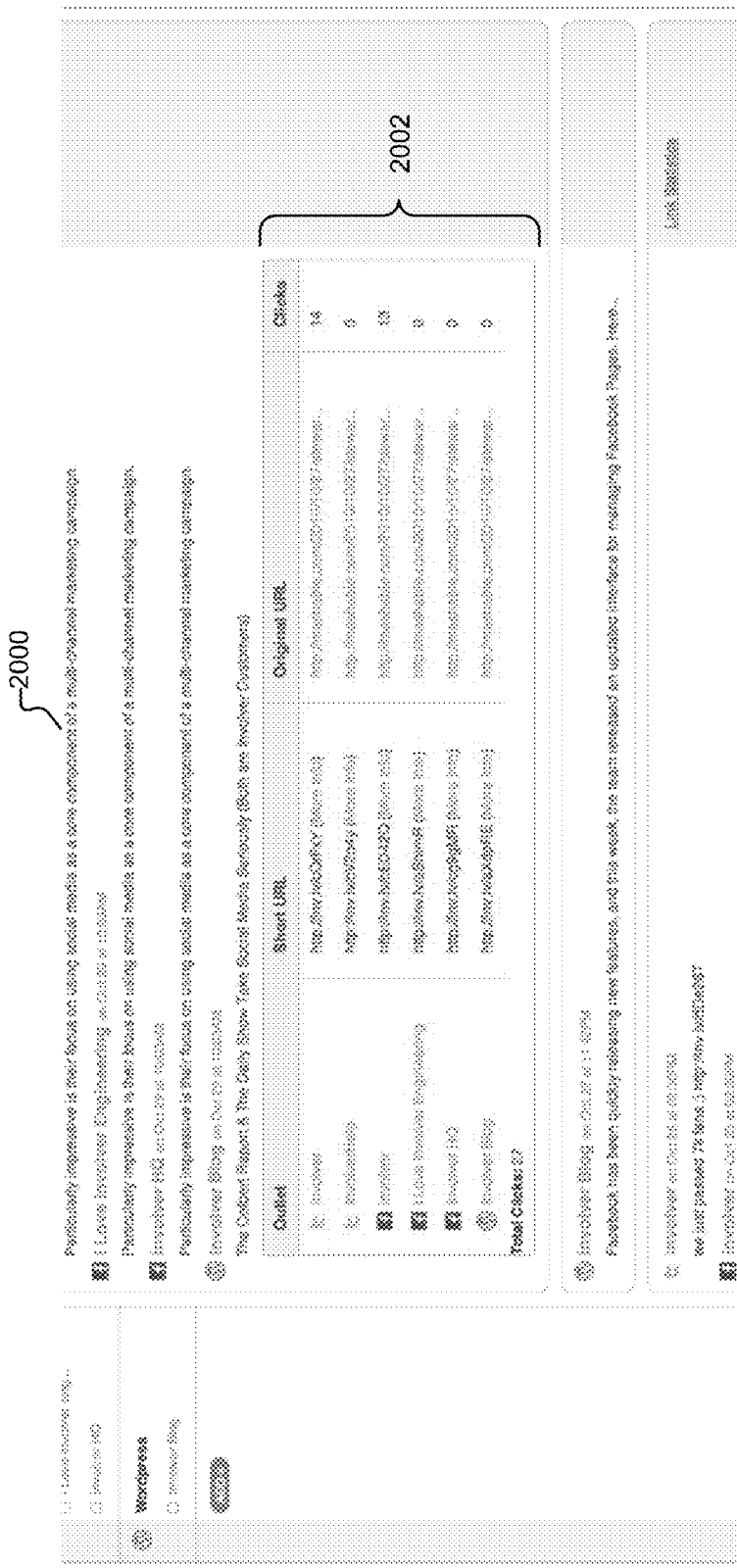
FIG. 20 is a diagram showing an embodiment of a display of tracked analytics of all the tracked links within a particular group.

FIG. 20 is a diagram showing an embodiment of a display of tracked analytics of all the tracked links within a particular group. In the example shown, link statistics table 2002 showing link analytics is displayed in response to an end user selecting link statistics 1906 of FIG. 19 and is a continuation of the user interface shown in FIG. 19. As can be seen in link statistics table 2002, each one of the shortened and tracked links is displayed with the outlet at which it was published, the original URL and the number of times on which it was clicked or selected (e.g., by an outlet viewer).

Figure 21:
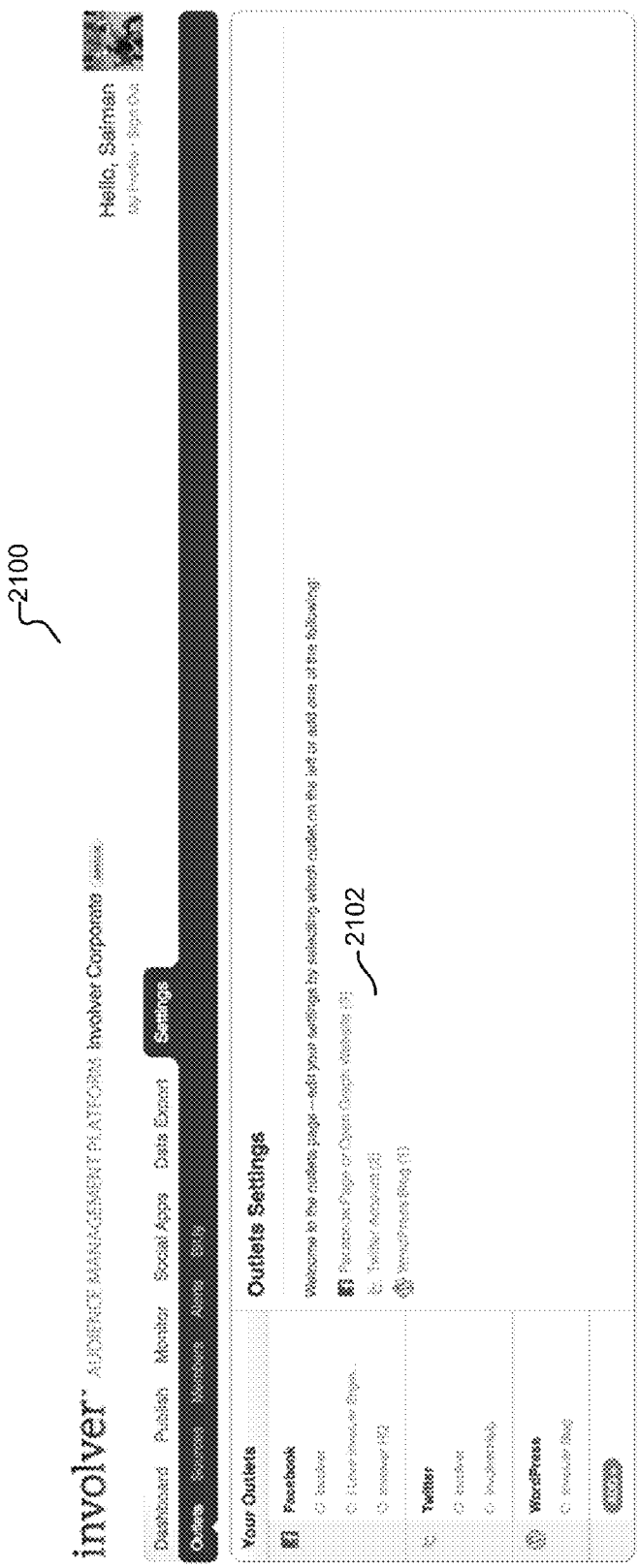
FIG. 21 is a diagram showing an embodiment of a user interface for changing the settings for outlets of various platforms.

FIG. 21 is a diagram showing an embodiment of a user interface for changing the settings for outlets of various platforms. In the example shown, user interface 2100 is presented when the Settings tab is selected and when the Outlets tab (from the tabs Outlets, Sources, Members, Alters and Bit.ly) is selected. User interface 2100 shows a list of platforms 2102 and their respective outlets (e.g., Facebook Pages or Open Graph Websites, Twitters accounts, and Wordpress blog). As indicated in user interface 2100, an end user may edit the settings of a particular outlet by clicking on the outlet at the left. Also as indicated in user interface 2100, an end user may add more outlets by clicking on a certain platform among list of platforms 2102. In some embodiments, via this interface an end user (such as a brand manager) provides login and password information (e.g., which is stored in outlet authentication storage) and any permissions or preferences for that outlet (e.g., which Involver accounts are permitted to publish to which outlets).

Figure 22:
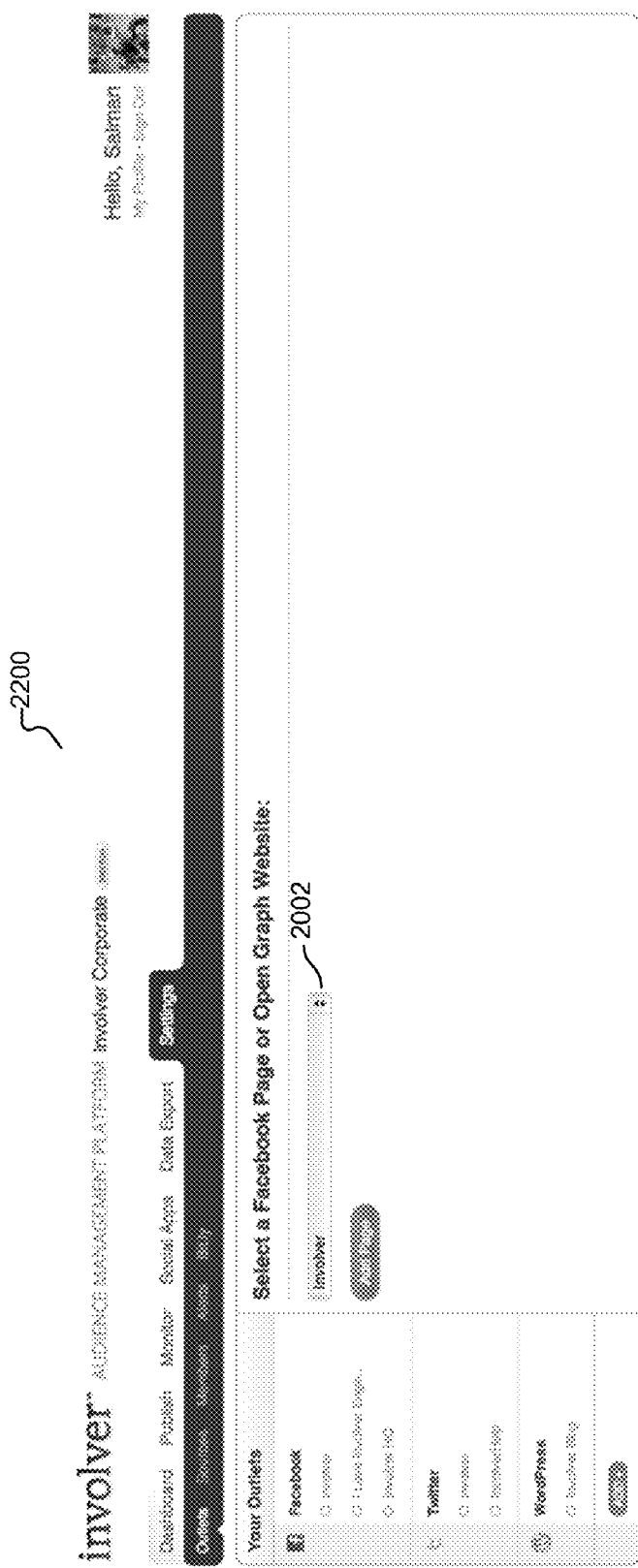
FIG. 22 is a diagram showing an embodiment of a user interface for adding an outlet.

FIG. 22 is a diagram showing an embodiment of a user interface for adding an outlet. Types of outlets associated with the Facebook platform include the "Facebook Page" and the "Open Graph Website." Drop down menu 2002 includes all the Facebook pages and/or Open Graph Website of which the end user is an administrator and which a publication server is aware of and can publish communications at. In some embodiments, when an end user adds an outlet associated with the Facebook platform for the first time (e.g., by pressing the Add Page button), the end user gives the system the appropriate authentication tokens or credentials associated with all of his accounts at Facebook for which he is an administrator.

Figure 23:
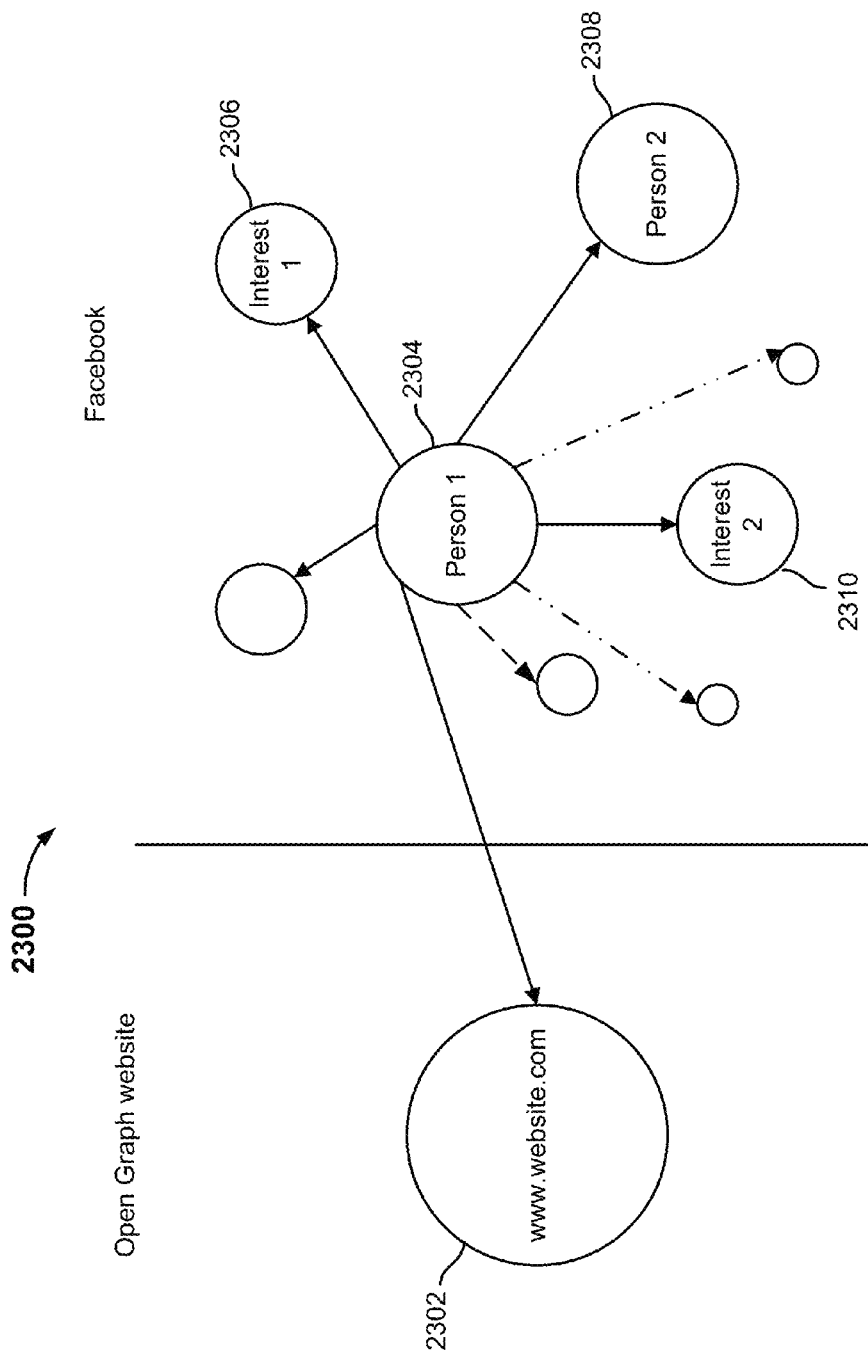
FIG. 23 is a diagram showing an embodiment of an Open Graph website.

FIG. 23 is a diagram showing an embodiment of an Open Graph website. In the example shown, website 2302 is a website that is included within the Open Graph network. For illustration, FIG. 23 shows elements as connected nodes in a network. In some embodiments website becomes included within the Open Graph network by virtue of integrating the Open Graph protocol into the mark-up language. As defined herein, an Open Graph website is one that is hosted by and/or has a URL associated with a first entity (e.g., www-.website.com in this example) but which is monitored by and/or part of a network associated with a second entity (e.g., Facebook). For example, node 2302 becomes a part of the Facebook network which includes nodes 2304-2310. Once a website becomes part of the Open Graph network, an account holder from the Facebook platform (e.g., 2304) may interact with the Open Graph website (e.g., select a "Like" button displayed on the website) and this interaction may be reflected Open Graph node 2302 and/or on other nodes. For example, a webpage associated with node 2302 when viewed may have the Facebook profile picture of the person who "liked" the page and the Facebook page of that person (e.g., associated with node 2304) may have a link or other reference to that user "liked" the website associated with node 2302. In some embodiments, any communication that is published to an Open Graph website may appear in a display area of published communications for the account holder at his account at the Facebook platform.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for publishing content, comprising:
   receiving, via a user interface provided by a server, an initial version of a communication, the communication being associated with marketing content corresponding to one or more brands;
   causing display, by the server, of the user interface for publishing the communication on a plurality of outlets;
   selecting, through a first portion of the user interface, a first outlet and a second outlet on which to publish the communication, wherein the first outlet and the second outlet are different platforms that support publishing content;
   reproducing, simultaneously, the initial version of the communication for customization in at least two editing windows in a second portion of the user interface, a first editing window of the at least two editing windows corresponding to the first outlet selected, and a second editing window of the at least two editing windows corresponding to the second outlet selected, wherein the initial version of the communication reproduced on the first and second editing windows received prior to receiving one or more customizations to the initial version of the communication, and wherein the initial version of the communication is customized, by the user interface provided by the server, to appear differently in the first editing window than in the second editing window, based at least in part on one or more different requirements of the first outlet and the second outlet;

customizing the initial version of the communication through the first editing window, such that a first customized communication to be published on the first outlet differs in content from an other communication to be published on the second outlet; and publishing the customized communication on the first outlet and the other communication on the second outlet.

2. The method of claim 1, wherein publishing comprises displaying content at one or more of: an Open Graph website; a social networking website; and a website associated with sharing audiovisual content.

3. The method of claim 1, further comprising:
determining whether the communication conforms to one or more parameters associated with at least one of the plurality of outlets; and
prompting a modification to the communication.

4. The method of claim 1, further comprising:
displaying a history of published communications, comprising a grouping of related communications.

5. The method of claim 1, further comprising:
displaying a preview of how a publication of the communication will appear for at least one outlet of the plurality of outlets, prior to publishing on one or more outlets of the plurality of outlets.

6. The method of claim 1, wherein the customizing comprises attaching rich media to the communication.

7. The method of claim 1, wherein the customizing comprises including a link in the communication.

8. The method of claim 7, wherein the customizing further comprises shortening the link included in the communication.

9. The method of claim 1, further comprising:
receiving scheduling information comprising a future time to publish the communication.

10. A system for publishing content, comprising:
a processor; and
a memory coupled with the processor, wherein the memory is configured to provide the processor with instructions which when executed cause the processor to:
receive, via a user interface provided by a server, an initial version of a communication, the communication being associated with marketing content corresponding to one or more brands;
cause display, by the server, of a user interface for publishing the communication on a plurality of outlets;
select, through a first portion of the user interface, a first outlet and a second outlet on which to publish the communication, wherein the first outlet and the second outlet are different platforms that support publishing content;
reproduce, simultaneously, the initial version of the communication for customization in at least two editing windows in a second portion of the user interface, a first editing window of the at least two editing windows corresponding to the first outlet selected, and a second editing window of the at least two editing windows corresponding to the second outlet selected, wherein the initial version of the communication reproduced on the first and second editing windows is received prior to receiving one or more customizations to the initial version of the communication, and wherein the initial version of the communication is customized, by the user interface provided by the server, to appear differently in the first editing window than in the second editing window, based at least in part on one or more different requirements of the first outlet and the second outlet;

customize the initial version of the communication through the first editing window, such that a first customized communication to be published on the first outlet differs in content from an other communication to be published on the second outlet; and publish the customized communication on the first outlet and the other communication on the second outlet.

11. The system of claim 10, wherein the instructions to publish comprise instructions for displaying content at one or more of: an Open Graph website; a social networking website; and a website associated with sharing audiovisual content.

12. The system of claim 10, wherein the memory is further configured to provide the processor with instructions which when executed cause the processor to:
determine whether the communication conforms to one or more parameters associated with at least one of the plurality of outlets; and
prompt a modification to the communication.

13. The system of claim 10, wherein the instructions to customize comprise instructions for attaching rich media to the communication.

14. The system of claim 10, wherein the instructions to customize comprise instructions for including a link in the communication.

15. The system of claim 14, wherein instructions to customize further comprise instructions to shorten the link included in the communication.

16. The system of claim 10, wherein the memory is further configured to provide the processor with instructions which when executed cause the processor to:
receive scheduling information comprising a future time to publish the communication.

17. A computer program product for publishing content, the computer program product being embodied in a computer readable storage medium and comprising computer instructions for:
receiving, via a user interface provided by a server, an initial version of a communication, the communication being associated with marketing content corresponding to one or more brands;
causing display, by the server, of the user interface for publishing the communication on a plurality of outlets;
selecting, through a first portion of the user interface, a first outlet and a second outlet on which to publish the communication, wherein the first outlet and the second outlet are different platforms that support publishing content;
reproducing, simultaneously, the initial version of the communication for customization in at least two editing windows in a second portion of the user interface, a first editing window of the at least two editing windows corresponding to the first outlet selected, and a second editing window of the at least two editing windows corresponding to the second outlet selected, wherein the initial version of the communication reproduced on the first and second editing windows received prior to receiving one or more customizations to the initial version of the communication, and wherein the initial version of the communication is customized, by the user interface provided by the server, to appear differently in the first editing window than in the second editing window, based at least in part on one or more different requirements of the first outlet and the second outlet;

customizing the initial version of the communication through the first editing window, such that a first customized communication to be published on the first outlet differs in content from an other communication to be published on the second outlet; and publishing the customized communication on the first outlet and the other communication on the second outlet.

18. The computer program product of claim 17, wherein the computer instructions for publishing comprise computer instructions for displaying content at one or more of: an Open Graph website; a social networking website; and a website associated with sharing audiovisual content.

19. The computer program product of claim 17, further comprising computer instructions for:

displaying a history of published communications, comprising a grouping of related communications.

20. The computer program product of claim 17, further comprising computer instructions for:

displaying a preview of how a publication of the communication will appear for at least one of the plurality of outlet prior to publishing on one or more outlets of the plurality of outlets.

21. The method of claim 1, wherein the one or more different requirements comprise a difference between a first character limit on publications to the first outlet and a second character limit on publications to the second outlet.

22. The method of claim 1, further comprising:

shortening, based on different character limits for the first outlet and the second outlet, a link in the customized communication but not the other communication.

23. The method of claim 1, further comprising:

causing display, by the server, based on the one or more different requirements, of an indication that content in the first editing window exceeds a character limit of the first outlet.

24. The system of claim 10, wherein the one or more different requirements comprise a difference between a first character limit on publications to the first outlet and a second character limit on publications to the second outlet.

25. The system of claim 10, wherein the memory is further configured to provide the processor with instructions which when executed cause the processor to:

shorten, based on different character limit requirements for the first outlet and the second outlet, a link in the customized communication but not in the other communication.

26. The system of claim 10, wherein the memory is further configured to provide the processor with instructions which when executed cause the processor to:

cause display of an indication that content in the first editing window exceeds a character limit of the first outlet.

27. The computer program product of claim 17, wherein the one or more different requirements comprise a difference between a first character limit on posts to the first outlet and a second character limit on posts to the second outlet.

28. The computer program product of claim 17, further comprising computer instructions for:

shortening, based on different character limits for the first outlet and the second outlet, a link in the customized communication but not the other communication.

29. The computer program product of claim 17, further comprising computer instructions for:

causing display, by the server, based on the one or more different requirements, of an indication that content in the first editing window exceeds a character limit of the first outlet.

* * * * *

UNITED STATES PATENT AND TRADEMARK OFFICE
CERTIFICATE OF CORRECTION

PATENT NO. : 9,990,114 B1
APPLICATION NO. : 13/004790
DATED : June 5, 2018
INVENTOR(S) : Horton et al.

Page 1 of 1

It is certified that error appears in the above-identified patent and that said Letters Patent is hereby corrected as shown below:

In the Specification

In Column 15, Line 27, delete "manger" and insert -- manager --, therefor.

Signed and Sealed this
Fifth Day of February, 2019

Andrei Iancu
*Director of the United States Patent and Trademark Office*